(12) United States Patent
Morimoto et al.

(10) Patent No.: US 9,829,224 B2
(45) Date of Patent: Nov. 28, 2017

(54) AIR-CONDITIONING APPARATUS

(75) Inventors: Osamu Morimoto, Tokyo (JP); Daisuke Shimamoto, Tokyo (JP); Koji Azuma, Tokyo (JP); Takayoshi Honda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 791 days.

(21) Appl. No.: 14/342,083

(22) PCT Filed: Dec. 16, 2011

(86) PCT No.: PCT/JP2011/007051
§ 371 (c)(1),
(2), (4) Date: Feb. 28, 2014

(87) PCT Pub. No.: WO2013/088484
PCT Pub. Date: Jun. 20, 2013

(65) Prior Publication Data
US 2014/0216083 A1 Aug. 7, 2014

(51) Int. Cl.
*F25B 29/00* (2006.01)
*F25B 13/00* (2006.01)
*F24F 11/00* (2006.01)
*F25B 25/00* (2006.01)

(52) U.S. Cl.
CPC ............ *F25B 29/003* (2013.01); *F25B 13/00* (2013.01); *F24F 2011/0013* (2013.01);
(Continued)

(58) Field of Classification Search
CPC .............. F25B 29/003; F25B 2347/021; F25B 2700/11; F25B 2347/02
(Continued)

(56) References Cited

U.S. PATENT DOCUMENTS

2011/0185756 A1* 8/2011 Yamashita ............... F24F 3/06
62/171
2012/0304675 A1* 12/2012 Motomura ............... F24F 3/06
62/156

FOREIGN PATENT DOCUMENTS

EP  2309199 A1  4/2011
EP  2360442 A1  8/2011
(Continued)

OTHER PUBLICATIONS

Office Action dated Aug. 12, 2014 issued in corresponding JP patent application No. 2013-548963 (and English translation).
(Continued)

*Primary Examiner* — Henry Crenshaw
(74) *Attorney, Agent, or Firm* — Posz Law Group, PLC

(57) ABSTRACT

A refrigerant circuit is configured by connecting, by pipes, a compressor that compresses a heat-source-side refrigerant, a first refrigerant flow switching device, a heat-source-side heat exchanger, an expansion device, and one or more intermediate heat exchangers that exchange heat between a heat-source-side refrigerant and a heat medium that is different from the heat-source-side refrigerant. A controller performs control of pumps to drive the pumps at a specific pump capacity or higher to circulate the heat medium at a time when a heat recovery defrosting operation for causing the heat-source-side refrigerant that has been heated by the heat medium in the intermediate heat exchangers to flow into the heat-source-side heat exchanger for defrosting purposes.

7 Claims, 8 Drawing Sheets

(52) U.S. Cl.
CPC ..... *F24F 2011/0089* (2013.01); *F25B 25/005* (2013.01); *F25B 2313/006* (2013.01); *F25B 2313/0231* (2013.01); *F25B 2339/047* (2013.01); *F25B 2600/13* (2013.01); *Y02B 30/745* (2013.01)

(58) Field of Classification Search
USPC .......................................... 62/151, 277, 278
See application file for complete search history.

(56) References Cited

FOREIGN PATENT DOCUMENTS

| | | | |
|---|---|---|---|
| EP | 2535652 A1 | 12/2012 | |
| JP | 06273011 A * | 9/1994 | |
| JP | 2009-041860 A | 2/2009 | |
| JP | WO 2011099054 A1 * | 8/2011 | ............... F24F 3/06 |
| WO | 2010/049998 A1 | 5/2010 | |
| WO | 2010/050002 A1 | 5/2010 | |
| WO | 2010-128551 A1 | 11/2010 | |
| WO | 2011/092802 A1 | 8/2011 | |
| WO | 2011-099054 A1 | 8/2011 | |

OTHER PUBLICATIONS

International Search Report of the International Searching Authority dated Jan. 31, 2012 for the corresponding international application No. PCT/JP2011/007051 (with English translation).
Extended European Search Report was dated Jul. 15, 2015 in the corresponding EP application No. 11877194.8.

* cited by examiner

AIR-CONDITIONING APPARATUS

CROSS REFERENCE TO RELATED APPLICATION

This application is a U.S. national stage application of International Patent Application No. PCT/JP2011/007051 filed on Dec. 16, 2011.

TECHNICAL FIELD

The present invention relates to an air-conditioning apparatus applied to, for example, a multi-air-conditioning apparatus for buildings.

BACKGROUND

For example, air-conditioning apparatuses exist that exchange heat between a heat-source-side refrigerant that circulates through a refrigeration cycle (refrigerant circuit) configured by connecting, by pipes, an outdoor unit and a relay unit, and an indoor-side refrigerant (heat medium) that circulates through a heat medium circuit configured by connecting, by pipes, the relay unit and an indoor unit. In addition, in applying an air-conditioning apparatus having such a configuration to a multi-air-conditioning apparatus for buildings or the like, for example, an apparatus exists which achieves energy saving by reducing the conveyance power for a heat medium (see, for example, Patent Literature 1). As described above, arranging two circulation circuits allows water or the like, which does not adversely affect health or the like of users inside a building, to be used as a refrigerant for a heat medium which circulates inside the building.

CITATION LIST

Patent Literature

Patent Literature 1: WO 2010/049998 (Page 3, FIG. 1, etc.)

Technical Problem

For example, among existing air-conditioning apparatuses as multi-air-conditioning apparatuses or the like for buildings, some available air-conditioning apparatuses have a defrosting operation mode for removing frost deposited on a heat-source-side heat exchanger are available. However, in the defrosting operation mode of such an air-conditioning apparatus, only a refrigerant delivered to an indoor unit that has been performing a heating operation until then and the heat capacity retained in an actuator in the path through which the refrigerant has been delivered are supplied to the heat-source-side heat exchanger and defrosting is performed. Therefore, a long time is required to complete defrosting. For example, with an air-conditioning apparatus using a heat medium as described above, when a heating operation in an indoor space is stopped and circulation of a heat medium is stopped, the heat medium may freeze.

SUMMARY

The present invention has been designed to overcome the problems described above and obtains an air-conditioning apparatus that is capable of improving energy efficiency by, for example, performing an efficient defrosting operation which effectively utilizes a heat medium.

An air-conditioning apparatus according to the present invention includes a refrigerant circuit configured by connecting, by pipes, a compressor that compresses a heat-source-side refrigerant, a refrigerant flow switching device for switching a circulation path for the heat-source-side refrigerant, a heat-source-side heat exchanger for causing the heat-source-side refrigerant to be subjected to heat exchange, an expansion device for adjusting the pressure of the heat-source-side refrigerant, and one or more intermediate heat exchangers that exchange heat between the heat-source-side refrigerant and a heat medium different from the heat-source-side refrigerant; a heat medium circuit configured by connecting, by pipes, one or more pumps for allowing the heat medium subjected to the heat exchange by the intermediate heat exchangers to circulate, a use-side heat exchanger of one or more use side heat exchangers that exchanges heat between the heat medium and air in an air-conditioning target space, and a flow switching device that switches, for the use-side heat exchanger, between passage of the heated heat medium and passage of the cooled heat medium; and a controller that performs, at a time when a heat recovery defrosting operation for causing the heat-source-side refrigerant that has been heated by the heat medium in the intermediate heat exchangers to flow into the heat-source-side heat exchanger and performing defrosting is performed, control such that the pumps are driven at a specific pump capacity or higher.

According to an air-conditioning apparatus of the present invention, in performing a heat recovery defrosting operation, a pump is driven at a specific pump capacity or higher. Therefore, in defrosting a heat-source-side heat exchanger, a heat medium may be prevented from freezing. In the heat recovery defrosting operation in which the heat medium heats a heat-source-side refrigerant, a heat quantity that is equal to or greater than a specific heat quantity or more may be supplied from the heat medium side to the heat-source-side refrigerant. Therefore, defrosting of the heat-source-side heat exchanger can be effectively performed.

DETAILED DESCRIPTION

Embodiment 1

Hereinafter, embodiments of the present invention will be explained with reference to the drawings.

Figure 1:
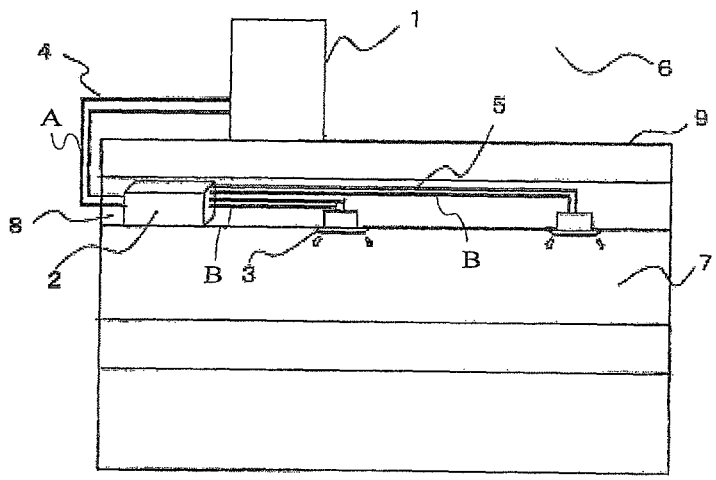
FIG. 1 is a schematic diagram illustrating an example of the installation of an air-conditioning apparatus according to Embodiment 1 of the present invention.

FIG. 1 is a schematic diagram illustrating an example of the installation of an air-conditioning apparatus according to Embodiment 1 of the present invention. The example of the installation of the air-conditioning apparatus will be explained with reference to FIG. 1. With the use of a refrigerant circuit A through which a heat-source-side refrigerant circulates and a heat medium circuit B through which a heat medium, such as water, antifreeze, or the like, circulates, the air-conditioning apparatus performs a cooling operation or a heating operation. In addition, each indoor unit can freely select between a cooling mode and a heating mode as an operation mode. In the drawings provided below including FIG. 1, the size relationship of individual components may differ from the actual size relationship. In addition, for a plurality of devices or the like of the same type which are distinguished from one another by subscripts or the like, unless otherwise needed to be particularly distinguished among them or specified, description may be provided without subscripts. Furthermore, regarding the degree of temperature, pressure, or the like, for example, how high or low is not particularly determined in relation to an absolute value, but is determined relative to a state, operation, or the like, of a system, an apparatus or the like.

In FIG. 1, the air-conditioning apparatus according to this embodiment includes an outdoor unit 1, which is a heat source unit, a plurality of indoor units 3, and a relay unit 2 that is arranged between the outdoor unit 1 and the indoor units 3. The relay unit 2 exchanges heat between a heat-source-side refrigerant and a heat medium. The outdoor unit 1 and the relay unit 2 are connected by refrigerant pipes 4 through which the heat-source side refrigerant flows. The relay unit 2 and each of the indoor units 3 are connected by pipes (heat medium pipes) 5 through which the heat medium flows. Cooling energy or heating energy generated by the outdoor unit 1 is delivered through the relay unit 2 to the indoor units 3.

Normally, the outdoor unit 1 is arranged in an outdoor space 6, which is a space (for example, a rooftop or the like) outside a structure 9 such as a building, and supplies cooling energy or heating energy through the relay unit 2 to the indoor units 3. The indoor units 3 are arranged at positions from which cooling air or heating air can be supplied to an indoor space 7, which is a space (for example, a living room or the like) inside the structure 9, and supply cooling air or heating air to the indoor space 7 serving as an air-conditioning target space. The relay unit 2 is configured so as to be installed at a position (for example, a shared space or a space above the ceiling in the structure 9, hereinafter, simply referred to as a space 8) that is different from the outdoor space 6 and the indoor space 7. The relay unit 2 is connected to the outdoor unit 1 and the indoor units 3 by the refrigerant pipes 4 and the pipes 5, respectively, and transmits to the indoor units 3 cooling energy or heating energy supplied from the outdoor unit 1.

As illustrated in FIG. 1, in the air-conditioning apparatus according to this embodiment, the outdoor unit 1 and the relay unit 2 are connected by the two refrigerant pipes 4, and the relay unit 2 and each of the indoor units 3 are connected by the two pipes 5. As described above, in the air-conditioning apparatus according to this embodiment, by connecting individual units (the outdoor unit 1, the indoor units 3, and the relay unit 2) using two pipes (the refrigerant pipes 4 and the pipes 5), simple construction can be achieved.

An operation of the air-conditioning apparatus according to this embodiment will be briefly explained.

A heat-source-side refrigerant is conveyed from the outdoor unit 1 to the relay unit 2 through the refrigerant pipes 4. The heat-source-side refrigerant that has been conveyed to the relay unit 2 is subjected to heat exchange with a heat medium by an intermediate heat exchanger (will be described later) in the relay unit 2, and heating energy or cooling energy is supplied to the heat medium. In the relay unit 2, the heating energy or the cooling energy stored in the heat medium is conveyed to the indoor units through the pipes 5 using pumps (will be described later). The heat medium conveyed to the indoor units 3 is used for a heating operation or a cooling operation for the indoor space 7.

In FIG. 1, a state is illustrated as an example in which the relay unit 2 is installed in the space 8, which is a space that is inside the structure 9 but is different from the indoor space 7, as a housing separated from the outdoor unit 1 and the indoor units 3. The relay unit 2 may be installed in a shared space or the like where an elevator or the like is located. Furthermore, although the case where the indoor units 3 are of a ceiling cassette type is illustrated as an example in FIG. 1, the type of the indoor units 3 is not limited to this. The indoor units 3 may be of any type, such as a ceiling-concealed type or a ceiling-suspended type, as long as they are capable of blowing heating air or cooling air to the indoor space 7 directly or via ducts or the like.

Although the case where the outdoor unit 1 is installed in the outdoor space 6 is illustrated as an example in FIG. 1, the outdoor unit 1 is not limited to this. For example, the outdoor unit 1 may be installed in a surrounded space such as a machine room provided with a ventilating opening. The outdoor unit 1 may be installed inside the structure 9 as long as waste heat can be discharged outside the structure 9 through an exhaust duct, or the outdoor unit 1 of a water-cooled type may be installed inside the structure 9. Even in the case where the outdoor unit 1 is installed in the above-mentioned place, no particular problem does occur.

Furthermore, the relay unit 2 may be installed in the vicinity of the outdoor unit 1. However, if the distance from the relay unit 2 to each of the indoor units 3 is too long, the conveyance power for a heat medium is significantly increased. Accordingly, it is necessary to pay attention to the fact that the energy-saving effect is reduced. Furthermore, the number of connected outdoor units 1, indoor units 3, and relay units 2 is not necessarily equal to the number illustrated in FIG. 1. The number of connected outdoor units 1, indoor units 3, and relay units 2 can be determined in accordance with the structure 9 for which the air-conditioning apparatus according to this embodiment is installed.

A plurality of relay units 2 may be connected to a single outdoor unit 1. By installing the plurality of relay units 2 in different spaces 8 in a scattered manner, transmission of heating energy or cooling energy can be realized by the heat-source-side heat exchanger mounted in each of the relay units 2. Furthermore, with this installation, the indoor units 3 can be installed at a distance or a height within a conveyance allowable range of the pumps mounted in the individual relay units 2, and the indoor units 3 can be arranged for the entire structure 9.

As a heat-source side refrigerant, for example, a single refrigerant, such as R-22 or R-134a, a near-azeotropic refrigerant mixture, such as R-410A or R-404A, a non-azeotropic refrigerant mixture, such as R-407C, a refrigerant, such as $CF_3CF=CH_2$, containing a double bond in its chemical formula and having a relatively low global warming potential, a mixture containing the refrigerant, or a natural refrigerant, such as $CO_2$ or propane, can be used. In an intermediate heat exchanger 25a or an intermediate heat exchanger 25b operating as a device for heating, a refrigerant in which normal two-phase change takes place is condensed and liquefied; whereas, a refrigerant, such as $CO_2$, which enters a supercritical state, is cooled in a supercritical state. However, except for this point, both the types of refrigerants perform the same operations and achieve the same effects.

As a heat medium, for example, brine (antifreeze), water, a liquid mixture of brine and water, a liquid mixture of water and an additive having a high anticorrosive effect, or the like may be used. Therefore, in the air-conditioning apparatus according to this embodiment, even if a heat medium leaks through the indoor units 3 to the indoor space 7, since a highly safe material is used for a heat medium, the use of the highly safe material contributes to improvement in the safety.

Figure 2:
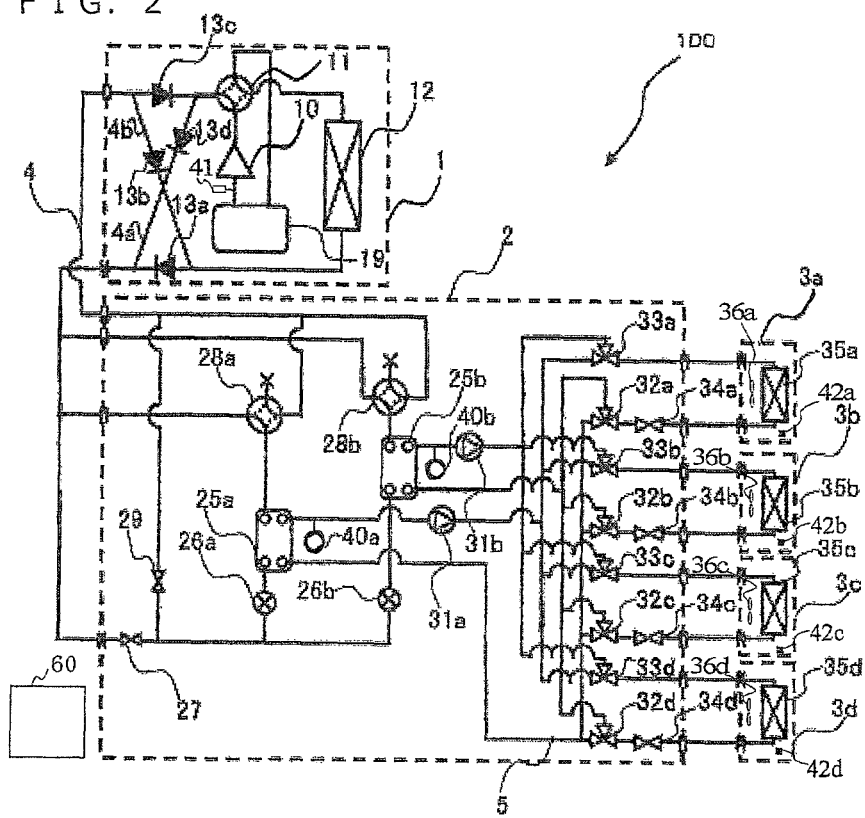
FIG. 2 is a schematic circuit diagram illustrating an example of the circuit configuration of the air-conditioning apparatus according to Embodiment 1 of the present invention.

FIG. 2 is a schematic circuit diagram illustrating an example of a circuit configuration of the air-conditioning apparatus (hereinafter, referred to as an air-conditioning apparatus 100) according to Embodiment 1. The circuit configuration of the air-conditioning apparatus 100 will be explained in detail with reference to FIG. 2. As illustrated in FIG. 2, the outdoor unit 1 and the relay unit 2 are connected by the refrigerant pipes 4 through the intermediate heat exchanger 25a and the intermediate heat exchanger 25b that are provided in the relay unit 2. In addition, the relay unit 2 and each of the indoor units 3 are connected by the pipes 5 through the intermediate heat exchanger 25a and the intermediate heat exchanger 25b. The refrigerant pipes 4 will be explained later in detail.

[Outdoor Unit 1]

The outdoor unit 1 is configured such that a compressor 10, a first refrigerant flow switching device 11 having a four-way valve or the like, a heat-source-side heat exchanger 12, and an accumulator 19 are connected in series by the refrigerant pipes 4 and are mounted in the housing of the outdoor unit 1. Furthermore, a first connecting pipe 4a, a second connecting pipe 4b, a check valve 13a, a check valve 13d, a check valve 13b, and a check valve 13c are provided in the outdoor unit 1. With the provision of the first connecting pipe 4a, the second connecting pipe 4b, the check valve 13a, the check valve 13d, the check valve 13b, and the check valve 13c, the flow of a heat-source-side refrigerant caused to flow into the relay unit 2 can be maintained in a constant direction, irrespective of the operation required by the indoor units 3.

The compressor 10 sucks a heat-source-side refrigerant, compresses the heat-source-side refrigerant into a high-temperature, high-pressure state, and conveys the refrigerant in that state to the refrigerant circuit A. The compressor 10 may be configured as, for example, an inverter compressor or the like for which capacity control can be performed. The first refrigerant flow switching device 11 performs switching between the flow of a heat-source-side refrigerant in a heating operation mode (a heating only operation mode and a heating main operation mode) and the flow of a heat-source-side refrigerant in a cooling operation mode (a cooling only operation mode and a cooling main operation mode).

The heat-source-side heat exchanger 12 functions as an evaporator at the time of a heating operation and functions as a condenser (or a radiator) at the time of a cooling operation. The heat-source-side heat exchanger 12 exchanges heat between air supplied from an air-sending device such as a fan or the like, which is not illustrated, and a heat-source-side refrigerant, and evaporates and gasifies or condenses and liquefies the heat-source-side refrigerant. The accumulator 19 is arranged on the suction side of the compressor 10. The accumulator 19 accumulates a surplus refrigerant produced by a difference between the time of a heating operation and the time of a cooling operation or a surplus refrigerant for a transient operation change.

The check valve 13a is arranged at the refrigerant pipe 4 positioned between the heat-source-side heat exchanger 12 and the relay unit 2 and allows a heat-source-side refrigerant to flow only in a specific direction (the direction from the outdoor unit 1 to the relay unit 2). The check valve 13c is arranged at the refrigerant pipe 4 positioned between the relay unit 2 and the first refrigerant flow switching device 11 and allows a heat-source-side refrigerant to flow only in a specific direction (the direction from the relay unit 2 to the outdoor unit 1). The check valve 13d is arranged at the first connecting pipe 4a and allows a heat-source-side refrigerant discharged from the compressor 10 at the time of a heating operation to flow to the relay unit 2. The checked valve 13b is arranged at the second connecting pipe 4b and allows a heat-source-side refrigerant returned from the relay unit 2 at the time of a heating operation to flow to the suction side of the compressor 10.

In the outdoor unit 1, the first connecting pipe 4a connects the refrigerant pipe 4 positioned between the first refrigerant flow switching device 11 and the check valve 13c to the refrigerant pipe 4 positioned between the check valve 13a and the relay unit 2. In the outdoor unit 1, the second connecting pipe 4b connects the refrigerant pipe 4 positioned between the check valve 13c and the relay unit 2 to the refrigerant pipe 4 positioned between the heat-source-side heat exchanger 12 and the check valve 13a. In FIG. 2, the case where the first connecting pipe 4a, the second connecting pipe 4b, the check valve 13a, the check valve 13d, the check valve 13b, and the check valve 13c are provided is illustrated as an example. However, the configuration is not limited to this. The first connecting pipe 4a, the second connecting pipe 4b, the check valve 13a, the check valve 13d, the check valve 13b, and the check valve 13c are not necessarily provided.

[Indoor Unit 3]

The indoor units 3 are each configured such that a use-side heat exchanger 35 is mounted in the housing of the indoor unit 3. The use-side heat exchangers 35 are connected to heat medium flow control devices 34 and second heat medium flow switching devices 33 in the relay unit 2 by the pipes 5. The use-side heat exchangers 35 exchange heat between a heat medium and air supplied from indoor fans 36, and generate heating air or cooling air. The indoor fans 36 promote, for example, heat exchange between a heat medium and air in an air-conditioning target space, and supply heating air or cooling air to the indoor space 7.

In FIG. 2, the case where four indoor units 3 are connected to the relay unit 2 is illustrated as an example, and an indoor unit 3*a*, an indoor unit 3*b*, an indoor unit 3*c*, and an indoor unit 3*d* are illustrated in that order from the top side in the drawing. Furthermore, regarding the use-side heat exchangers 35, a use-side heat exchanger 35*a*, a use-side heat exchanger 35*b*, a use-side heat exchanger 35*c*, and a use-side heat exchanger 35*d* are illustrated in that order from the top side in the drawing, corresponding to the indoor units 3*a* to 3*d*. As in FIG. 1, the number of connected indoor units 3 is not necessarily four as illustrated in FIG. 2.

[Relay Unit 2]

The relay unit 2 is configured such that the at least two intermediate heat exchangers (refrigerant-water heat exchangers) 25, two expansion devices 26, an opening/closing device 27, an opening/closing device 29, two second refrigerant flow switching devices 28, two pumps 31, four first heat medium flow switching devices 32, the four second heat medium flow switching devices 33, and the four heat medium flow control devices 34 are mounted in the housing of the relay unit 2.

The two intermediate heat exchangers 25 (the intermediate heat exchanger 25*a* and the intermediate heat exchanger 25*b*) function as condensers (radiators) at the time when supplying a heat medium to an indoor unit 3 that is performing a heating operation or function as evaporators at the time when supplying a heat medium to an indoor unit 3 that is performing a cooling operation. The intermediate heat exchangers 25 exchange heat between a heat-source-side refrigerant and a heat medium, and transmit cooling energy or heating energy generated by the outdoor unit 1 and stored in the heat-source-side refrigerant to the heat medium.

The intermediate heat exchanger 25*a* is arranged between an expansion device 26*a* and a second refrigerant flow switching device 28*a* in the refrigerant circuit A. The intermediate heat exchanger 25*a* is used for cooling a heat medium in a cooling only operation more and in a cooling and heating mixed operation mode and is used for heating a heat medium in a heating only operation mode. The intermediate heat exchanger 25*b* is arranged between an expansion device 26*b* and a second refrigerant flow switching device 28*b* in the refrigerant circuit A. The intermediate heat exchanger 25*b* is used for heating a heat medium in a heating only operation mode and in the cooling and heating mixed operation mode and is used for cooling a heat medium in a cooling only operation mode.

The two expansion devices 26 (the expansion device 26*a* and the expansion device 26*b*) each have a function of a pressure reducing valve and an expansion valve and reduce the pressure of a heat-source-side refrigerant to expand the heat-source-side refrigerant. The expansion device 26*a* is arranged on the upstream side of the intermediate heat exchanger 25*a* in the flow of a heat-source-side refrigerant at the time of a cooling operation. The expansion device 26*b* is arranged on the upstream side of the intermediate heat exchanger 25*b* in the flow of a heat-source-side refrigerant at the time of a cooling operation. The two expansion devices 26 may be configured as devices for which the opening degree can be variably controlled, for example, such as electronic expansion valves or the like.

The opening/closing device 27 and the opening/closing device 29 are each configured as, for example, a solenoid valve or the like that is capable of performing opening and closing operations by electrification. Opening and closing of the opening/closing device 27 and the opening/closing device 29 is controlled in accordance with the operation mode of the indoor units 3, and the opening/closing device 27 and the opening/closing device 29 perform switching of the flow of a refrigerant in the refrigerant circuit A. The opening/closing device 27 is arranged at the refrigerant pipe 4 positioned on the entry side of a heat-source-side refrigerant. The opening/closing device 29 is arranged at a pipe (bypass pipe) that connects the refrigerant pipe 4 on the entry side of a heat-source-side refrigerant to the refrigerant pipe 4 on the exit side of a heat-source side refrigerant.

The two second refrigerant flow switching devices 28 (the second refrigerant flow switching device 28*a* and the second refrigerant flow switching device 28*b*) are each configured as, for example, a four-way valve, and perform switching of the flow of a heat-source-side refrigerant in such a manner that the intermediate heat exchangers 25 are capable of being used as condensers or evaporators in accordance with the operation mode of the indoor units 3. The second refrigerant flow switching device 28*a* is arranged on the downstream side of the intermediate heat exchanger 25*a* in the flow of a heat-source-side refrigerant at the time of a cooling operation. The second refrigerant flow switching device 28*b* is arranged on the downstream side of the intermediate heat exchanger 25*b* in the flow of a heat-source-side refrigerant in the cooling only operation mode.

The two pumps 31 (a pump 31*a* and a pump 31*b*) allow a heat medium which flows through the pipes 5 to be conveyed to the indoor units 3. The pump 31*a* is arranged for the pipe 5 positioned between the intermediate heat exchanger 25*a* and each of the second heat medium flow switching devices 33. The pump 31*b* is arranged for the pipe 5 positioned between the intermediate heat exchanger 25*b* and each of the second heat medium flow switching devices 33. The two pumps 31 may be configured as, for example, pumps for which capacity control can be performed, and the flow rate of the pumps 31 may be adjusted according to the size of the load in the indoor units 3.

The four first heat medium flow switching devices 32 (first heat medium flow switching devices 32*a* to 32*d*) are each configured as a three-way valve or the like and perform switching of the flow of a heat medium. One of the three ways of each of the first heat medium flow switching devices 32 is connected to the intermediate heat exchanger 25*a*, another one of the three ways is connected to the intermediate heat exchanger 25*b*, and the other one of the three ways is connected to the corresponding one of the heat medium flow control devices 34. The first heat medium flow switching devices 32 are arranged on the exit side of the heat medium flows of the use-side heat exchangers 35. That is, the first heat medium flow switching devices 32 perform switching of the flow of a heat medium to be caused to flow into the indoor units 3 between the intermediate heat exchanger 25*a* and the intermediate heat exchanger 25*b*.

The number of the installed first heat medium flow switching devices 32 corresponds to the number of the installed indoor units 3 (here, four). The first heat medium flow switching device 32*a*, the first heat medium flow switching device 32*b*, the first heat medium flow switching device 32*c*, and the first heat medium flow switching device 32*d* are illustrated in that order from the top side in the drawing, in accordance with the indoor units 3. Furthermore, the switching of the heat medium flow includes partial switching from one to another way as well as complete switching from one to another way.

The four second heat medium flow switching devices 33 (second heat medium flow switching devices 33*a* to 33*d*) are each configured as a three-way valve or the like and perform switching of the flow of a heat medium. One of the three ways of each of the second heat medium flow switching devices 33 is connected to the intermediate heat exchanger 25a, another one of the three ways is connected to the intermediate heat exchanger 25b, and the other one of the three ways is connected to the corresponding one of the use-side heat exchangers 35. The second heat medium flow switching devices 33 are arranged on the entry side of the heat medium flows of the use-side heat exchangers 35. That is, the second heat medium flow switching devices 33, together with the first heat medium flow switching devices 32, perform switching of the flow of a heat medium caused to flow into the indoor units 3 between the intermediate heat exchanger 25a and the intermediate heat exchanger 25b.

The number of the installed second heat medium flow switching devices 33 corresponds to the number of the installed indoor units 3 (here, four). The second heat medium flow switching device 33a, the second heat medium flow switching device 33b, the second heat medium flow switching device 33c, and the second heat medium flow switching device 33d are illustrated in that order from the top side in the drawing, in accordance with the indoor units 3. Furthermore, the switching of the heat medium flow includes partial switching from one to another way as well as complete switching from one to another way.

The four heat medium flow control devices 34 (heat medium flow control devices 34a to 34d) are each configured as a two-way valve or the like for which the opening area can be controlled and control the flow rate of a heat medium flowing through the pipe 5. One of the two ways of each of the heat medium flow control devices 34 is connected to the corresponding one of the use-side heat exchangers 35 and the other one of the two ways is connected to the corresponding one of the first heat medium flow switching devices 32. The heat medium flow control devices 34 are arranged on the exit side of the heat medium flows of the use-side heat exchangers 35. That is, the heat medium flow control devices 34 adjust the amount of heat medium flowing into the indoor units 3 on the basis of the temperature of a heat medium flowing into the indoor units 3 and the temperature of a heat medium flowing out of the indoor units 3, and are capable of supplying an optimal amount of heat medium corresponding to the indoor load to the indoor units 3.

The number of the installed heat medium flow control devices 34 corresponds to the number of the installed indoor units 3 (here, four). The heat medium flow control device 34a, the heat medium flow control device 34b, the heat medium flow control device 34c, and the heat medium flow control device 34d are illustrated in that order from the top side in the drawing, in accordance with the indoor units 3. The heat medium flow control devices 34 may be arranged on the entry side of the heat medium flows of the use-side heat exchangers 35, that is, positions between the use-side heat exchangers 35 and the second heat medium flow switching devices 33. Furthermore, in the case of stopping, thermo-off, or the like, which does not require load, in the indoor units 3, by fully closing the heat medium flow control devices 34, heat medium supply to the indoor units 3 can be stopped.

Furthermore, two temperature sensors 40 (a temperature sensor 40a and a temperature sensor 40b) are provided in the relay unit 2. Information (temperature information) detected by the temperature sensors 40 is transmitted to a controller 60 that performs integrated control of the operation of the air-conditioning apparatus 100, and is used for controlling the driving frequency of the compressor 10, the rotation speed of an air-sending device, which is not illustrated, switching of the first refrigerant flow switching device 11, the driving frequency of the pumps 31, switching of the second refrigerant flow switching devices 28, switching of the flow of a heat medium, adjustment of the flow rate of the heat medium in the indoor units 3, and the like.

The two temperature sensors 40 detect the temperature of flows of heat medium out of the intermediate heat exchangers 25, that is, flows of heat medium at the exit of the intermediate heat exchangers 25, and each may be configured as a thermistor or the like. The temperature sensor 40a is arranged at the pipe 5 positioned on the entry side of the pump 31a. The temperature sensor 40b is arranged on the pipe 5 positioned on the entry side of the pump 31b.

The outdoor unit 1 includes, on the suction side of the compressor 10, a refrigerant pressure sensor 41 for detecting a low-pressure-side pressure in the refrigerant circuit A. Furthermore, the indoor units 3 include four indoor temperature sensors 42 (indoor temperature sensors 42a to 42d) for detecting indoor air temperature. The indoor temperature sensors 42 each may be configured as, for example, a thermistor.

Furthermore, the air-conditioning apparatus 100 includes the controller 60 that controls the operation of individual components mounted in the units of the air-conditioning apparatus, on the basis of information from individual detecting means and a remote control for receiving instructions from a user. The controller 60 controls the driving frequency of the compressor 10, the rotation speed (including ON/OFF) of the air-sending device, switching of the first refrigerant flow switching device 11, driving of the pumps 31, the opening degree of the expansion devices 26, opening and closing of the opening/closing device 27, opening and closing of the opening/closing device 29, switching of the second refrigerant flow switching devices 28, switching of the first heat medium flow switching devices 32, switching of the second heat medium flow switching devices 33, driving of the heat medium flow control devices 34, and the like, and executes various operation modes, which will be described later. Furthermore, the controller 60 is configured to control the rotation speed (including ON/OFF) of air-sensing devices arranged near the use-side heat exchangers 35 mounted in the indoor units 3. In particular, in this embodiment, the controller 60 performs processing for performing a defrosting operation with high energy efficiency. The controller 60 is configured by, for example, a microcomputer or the like. The controller 60 also includes a storage device (not illustrated) for storing data and the like. Here, the controller may be provided for each unit. In this case, the controllers may be capable of communicating with each other.

The pipes 5 through which a heat medium flows include pipes connected to the intermediate heat exchanger 25a and pipes connected to the intermediate heat exchanger 25b. The pipes 5 branch off in accordance with the number of the indoor units 3 connected to the relay unit 2 (here, four branches for each pipe). The pipes 5 are connected through the first heat medium flow switching devices 32 and the second heat medium flow switching devices 33. By controlling the first heat medium flow switching devices 32 and the second heat medium flow switching devices 33, determination as to whether a heat medium from the intermediate heat exchanger 25a is to be flowed into the use-side heat exchangers 35 or a heat medium from the intermediate heat exchanger 25b is to be flowed into the use-side heat exchangers 35 is made.

In the air-conditioning apparatus 100, the compressor 10, the first refrigerant flow switching device 11, the heat-source-side heat exchanger 12, the opening/closing device 17, the second refrigerant flow switching devices 28, the refrigerant flow path for the intermediate heat exchanger 25a, the expansion devices 26, and the accumulator 19 are connected through the refrigerant pipes 4 to configure the refrigerant circuit A. Furthermore, the heat medium flow for the intermediate heat exchanger 25a, the pump 31, the first heat medium flow switching devices 32, the heat medium flow path control devices 34, the use-side heat exchangers 35, and the second heat medium flow switching devices 33 are connected through the pipes 5 to configure a heat medium circuit B. That is, the plurality of use-side heat exchangers 35 are connected in parallel to each of the intermediate heat exchangers 25, so that the heat medium circuit B is configured as plural systems.

Accordingly, in the air-conditioning apparatus 100, the outdoor unit 1 and the relay unit 2 are connected through the intermediate heat exchanger 25a and the intermediate heat exchanger 25b provided in the relay unit 2, and the relay unit 2 and the indoor units 3 are also connected through the intermediate heat exchanger 25a and the intermediate heat exchanger 25b. That is, in the air-conditioning apparatus 100, heat exchange is performed, in the intermediate heat exchanger 25a and the intermediate heat exchanger 25b, between a heat-source-side refrigerant circulating in the refrigerant circuit A and a heat medium circulating in the heat medium circuit B. With the use of this system configuration, the air-conditioning apparatus 100 is capable of achieving an optimal cooling operation or heating operation corresponding to the indoor load.

Various operation modes executed by the air-conditioning apparatus 100 will be explained. The air-conditioning apparatus 100 is capable of performing, with each of the indoor units 3, a cooling operation or a heating operation, on the basis of an instruction from the indoor unit 3. That is, the air-conditioning apparatus 100 is capable of allowing all the indoor units 3 to perform the same operations and allowing the individual indoor units 3 to perform different operations.

The operation modes executed by the air-conditioning apparatus 100 include a cooling only operation mode in which all of the operating indoor units 3 perform cooling operations, a heating only operation mode in which all of the operating indoor units 3 perform heating operations, a cooling main operation mode, which is a cooling and heating mixed operation mode in which the cooling load is larger than heating load, and a heating main operation mode, which is a cooling and heating mixed operation mode in which the heating load is larger than the cooling load. In addition, the air-conditioning apparatus 100 has a first defrosting operation mode (heat recovery defrosting operation mode) and a second defrosting operation mode (bypass defrosting operation mode). Hereinafter, the various operation modes as well as the flow of a heat-source-side refrigerant and a heat medium will be explained. Here, in FIGS. 3 to 8 for explaining the operation modes, some components are omitted for the sake of convenience.

[Heating Only Operation Mode]

Figure 3:
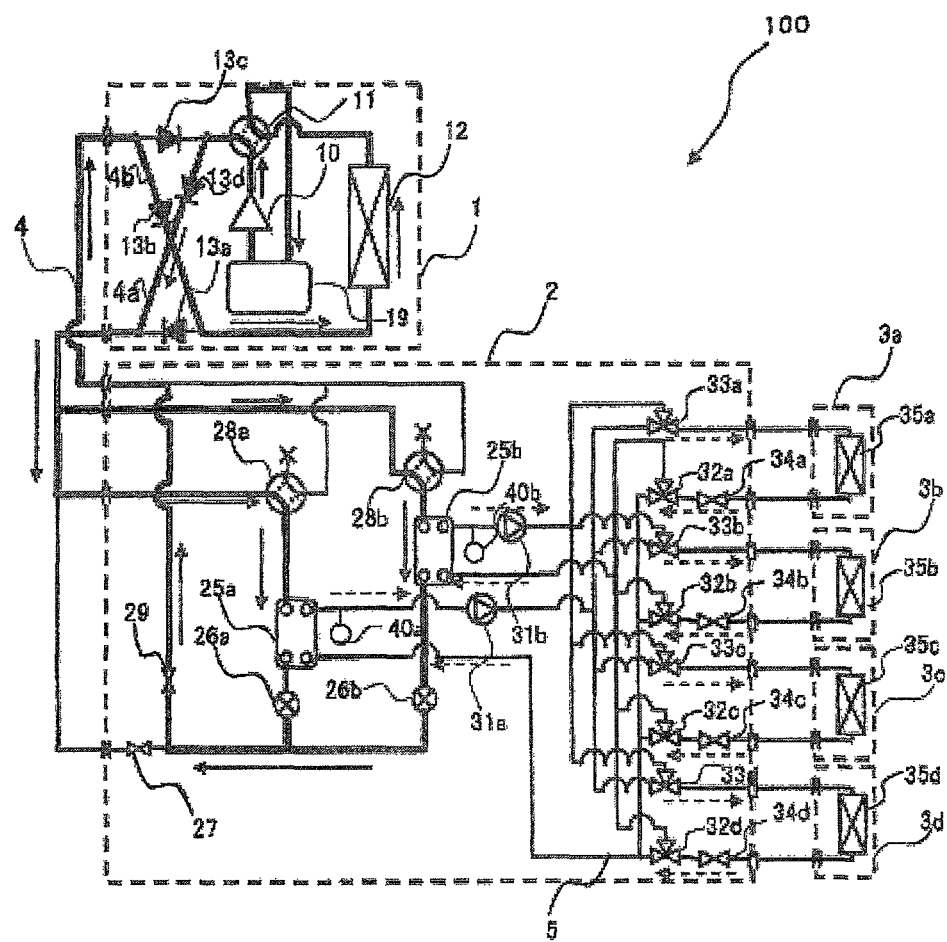
FIG. 3 is a refrigerant circuit diagram illustrating the flow of a refrigerant when the air-conditioning apparatus according to Embodiment 1 of the present invention is in a heating only operation mode.

FIG. 3 is a refrigerant circuit diagram illustrating the flow of a refrigerant when the air-conditioning apparatus 100 is in the heating only operation mode. In FIG. 3, the case where all the indoor units 3 are being driven will be explained by way of example. In FIG. 3, the refrigerant pipes 4 expressed by thick lines represent the flow of a heat-source-side refrigerant in the heating only operation mode. Furthermore, in FIG. 3, the direction of the flow of the heat-source-side refrigerant is expressed by solid-line arrows, and the direction of the flow of a heat medium is expressed by broken-line arrows.

In the case of the heating only operation mode illustrated in FIG. 3, the outdoor unit 1 performs switching for the first refrigerant flow switching device 11 in such a manner that a heat-source-side refrigerant discharged from the compressor 10 flows into the relay unit 2 without passing through the heat-source-side heat exchanger 12.

In the relay unit 2, the second refrigerant flow switching device 28a and the second refrigerant flow switching device 28b are switched to the heating side, the pump 31a and the pump 31b are driven, and the heat medium flow control devices 34 are opened, so that a heat medium circulates between the intermediate heat exchanger 25a and each of the use-side heat exchangers 35 and between the intermediate heat exchanger 25b and each of the use-side heat exchangers 35. The opening degree of the expansion device 26a is controlled such that the degree of superheat of a refrigerant at the exit of the intermediate heat exchanger 25a is set to a specific target value. Similarly, the opening degree of the expansion device 26b is controlled such that the degree of subcooling of a refrigerant at the exit of the intermediate heat exchanger 25b is set to a specific target value. Furthermore, the opening/closing device 27 is closed, and the opening/closing device 29 is opened.

The opening degrees of the second heat medium flow switching devices 33 are adjusted to intermediate opening degrees or to opening degrees corresponding to the heat medium temperature at the exit of the intermediate heat exchanger 25a and the intermediate heat exchanger 25b so that flows of heat medium conveyed from both the intermediate heat exchanger 25a and the intermediate heat exchanger 25b can be supplied to the heat medium flow control devices 34 and the indoor units 3.

First, the flow of a heat-source-side refrigerant in the refrigerant circuit A will be explained.

A low-temperature, low-pressure refrigerant is compressed by the compressor 10, and is discharged as a high-temperature, high-pressure gas refrigerant. The high-temperature, high-pressure gas refrigerant discharged from the compressor 10 passes through the first refrigerant flow switching device 11, flows through the first connecting pipe 4a, passes through the check valve 13d, and flows out of the outdoor unit 1. The high-temperature, high-pressure gas refrigerant that has flowed out of the outdoor unit 1 passes through the refrigerant pipe 4 and flows into the relay unit 2. The high-temperature, high-pressure gas refrigerant that has flowed into the relay unit 2 is split out, and the split flows of gas-state refrigerant pass through the second refrigerant flow switching device 28a and the second refrigerant flow switching device 28b and flow into the intermediate heat exchanger 25a and the intermediate heat exchanger 25b.

The high-temperature, high-pressureflows of high-temperature, high-pressure gas-state refrigerant that have flowed into the intermediate heat exchanger 25a and the intermediate heat exchanger 25b are condensed and liquefied into flows of high-pressure liquid-state refrigerant while transferring heat to a heat medium circulating in the heat medium circuit B. The liquid flows of refrigerant out of the intermediate heat exchanger 25a and the intermediate heat exchanger 25b are expanded by the expansion device 26a and the expansion device 26b and turn into low-temperature, low-pressureflows of low-temperature, low-pressure two-phase refrigerant. The two-phase flows of refrigerant are merged into one and pass through the opening/closing device 29. The merged refrigerant flows out of the relay unit 2, passes through the refrigerant pipe 4, and flows into the outdoor unit 1 again. The refrigerant that has flowed into to the outdoor unit 1 flows through the second connecting pipe 4b, passes through the check valve 13b, and flows into the heat-source-side heat exchanger 12 operating as an evaporator.

Then, the refrigerant that has flowed into the heat-source-side heat exchanger 12 removes heat from outdoor air by the heat-source-side heat exchanger 12 and turns into a low-temperature, low-pressure gas refrigerant. The low-temperature, low-pressure gas refrigerant that has flowed out of the heat-source-side heat exchanger 12 passes through the first refrigerant flow switching device 11 and the accumulator 19, and is sucked into the compressor 10 again.

Next, the flow of a heat medium in the heat medium circuit B will be explained.

In the heating only operation mode, both the intermediate heat exchanger 25a and the intermediate heat exchanger 25b transmit the heating energy of heat-source-side flows of refrigerant to flows of heat medium, and the pump 31a and the pump 31b allow the flows of high-temperature heat medium to flow through the pipes 5. The flows of heat medium that have been pressurized by and flowed out of the pump 31a and the pump 31b pass through the second heat medium flow switching devices 33a to 33d. The flow rates of the flows of heat medium are adjusted by the heat medium flow control devices 34a to 34d, and then the flows of heat medium flow into the use-side heat exchangers 35a to 35d. Then, when the flows of high-temperature heat medium transfer heat to indoor air by the use-side heat exchangers 35a to 35d, heating of the indoor space 7 is performed.

Then, the flows of heat medium flow out of the use-side heat exchangers 35a to 35d and are conveyed from the indoor units 3a to 3d to the relay unit 2. The flows of heat medium conveyed to the relay unit 2 flow into the heat medium flow control devices 34a to 34d. The flows of heat medium out of the heat medium flow control devices 34a to 34d pass through the first heat medium flow switching devices 32a to 32d, flow into the intermediate heat exchanger 25a and the intermediate heat exchanger 25b, receive from the heat-source-side refrigerant a heat quantity corresponding to the quantity supplied through the indoor units 3 to the indoor space 7, and are sucked into the pump 31a and the pump 31b again.

[Heating Main Operation Mode]

Figure 4:
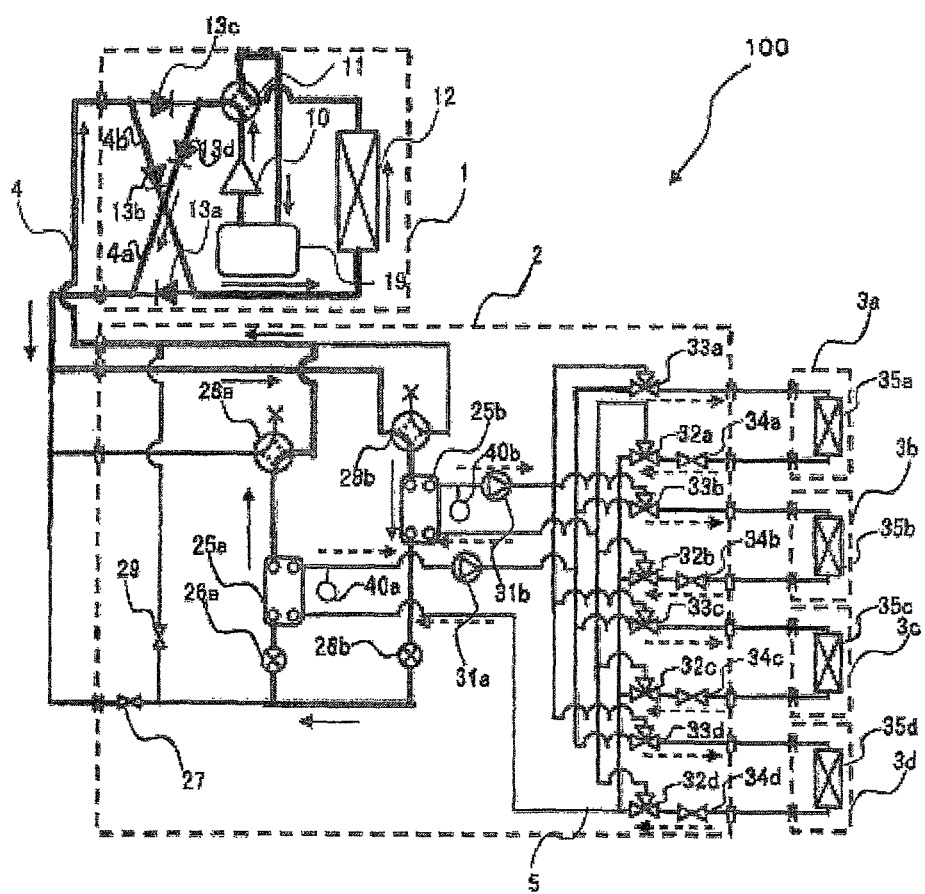
FIG. 4 is a refrigerant circuit diagram illustrating the flow of a refrigerant when the air-conditioning apparatus according to Embodiment 1 of the present invention is in a heating main operation mode.

FIG. 4 is a refrigerant circuit diagram illustrating the flow of a refrigerant at a time when the air-conditioning apparatus 100 is in the heating main operation mode. In FIG. 4, the refrigerant pipes 4 expressed by thick lines represent the flow of a heat-source-side refrigerant in the heating main operation mode. Furthermore, in FIG. 4, the direction of the flow of the heat-source-side refrigerant is expressed by solid-line arrows, and the direction of the flow of a heat medium is expressed by broken-line arrows.

In the case of the heating main operation mode illustrated in FIG. 4, the outdoor unit 1 performs switching for the first refrigerant flow switching device 11 in such a manner that a heat-source-side refrigerant discharged from the compressor 10 flows into the relay unit 2 without passing through the heat-source-side heat exchanger 12.

In the relay unit 2, the second refrigerant flow switching device 28a is switched to the cooling side, the second refrigerant flow switching device 28b is switched to the heating side, the pump 31a and the pump 31b are driven, and the heat medium flow control devices 34 are opened, and the first heat medium flow switching devices 32 and the second heat medium flow switching devices 33 are switched according to operation modes executed by the indoor units 3. The opening degree of the expansion device 26b is controlled such that the degree of subcooling of a refrigerant at the exit of the intermediate heat exchanger 25b is set to a specific target value. Furthermore, the expansion device 26a is fully opened, the opening/closing device 27 is closed, and the opening/closing device 29 is closed. By fully opening the expansion device 26b, the degree of subcooling may be controlled by the expansion device 26a.

The second heat medium flow switching devices 33 are switched to the direction in which the intermediate heat exchanger 25b and the pump 31b are connected when the connected indoor units 3 are executing a heating operation mode; whereas, the second heat medium flow switching devices 33 are switched to the direction in which the intermediate heat exchanger 25a and the pump 31a are connected when the connected indoor units 3 are executing a cooling operation mode. That is, depending on the operation modes of the indoor units 3, a heat medium to be supplied to the indoor units 3 can be switched between hot water or cold water.

Furthermore, the first heat medium flow switching devices 32 are switched to the direction in which the intermediate heat exchanger 25b is connected when the connected indoor units 3 are executing a heating operation mode; whereas, the first heat medium flow switching devices 32 are switched to the direction in which the intermediate heat exchanger 25a is connected when the connected indoor units 3 are executing a cooling operation mode. Accordingly, a heat medium used in a heating operation mode may be caused to flow into the intermediate heat exchanger 25b functioning for heating, and a heat medium used in a cooling operation mode may be caused to flow into the intermediate heat exchanger 25a functioning as a device for cooling.

First, the flow of a heat-source-side refrigerant in the refrigerant circuit A will be explained.

A low-temperature, low-pressure refrigerant is compressed by the compressor 10, and is discharged as a high-temperature, high-pressure gas refrigerant. The high-temperature, high-pressure gas refrigerant discharged from the compressor 10 passes through the first refrigerant flow switching device 11, flows through the first connecting pipe 4a, passes through the check valve 13d, and flows out of the outdoor unit 1. The high-temperature, high-pressure gas refrigerant that has flowed out of the outdoor unit 1 passes through the refrigerant pipe 4 and flows into the relay unit 2. The high-temperature, high-pressure gas refrigerant that has flowed into the relay unit 2 passes through the second refrigerant flow switching device 28b and flows into the intermediate heat exchanger 25b operating as a condenser.

The gas refrigerant that has flowed into the intermediate heat exchanger 25b is condensed and liquefied into a liquid refrigerant while transferring heat to a heat medium circulating in the heat medium circuit B. The liquid refrigerant that has flowed out of the intermediate heat exchanger 25b is expanded by the expansion device 26b and turns into a low-pressure two-phase refrigerant. The low-pressure two-phase refrigerant passes through the expansion device 26a and flows into the intermediate heat exchanger 25a operating as an evaporator. The low-pressure two-phase refrigerant that has flowed into the intermediate heat exchanger 25a evaporates by receiving heat from the heat medium circulating in the heat medium circuit B and thus cools the heat medium. The low-pressure two-phase refrigerant flows out of the intermediate heat exchanger 25a, passes through the second refrigerant flow switching device 28a, flows out of the relay unit 2, passes through the refrigerant pipe 4, and flows into the outdoor unit 1 again.

The refrigerant that has flowed into the outdoor unit 1 passes through the check valve 13b, and flows into the heat-source-side heat exchanger 12 operating as an evaporator. Then, the refrigerant that has flowed into the heat-source-side heat exchanger 12 removes heat from outdoor air by the heat-source-side heat exchanger 12 and turns into a low-temperature, low-pressure gas refrigerant. The low-temperature, low-pressure gas refrigerant that has flowed out of the heat-source-side heat exchanger 12 passes through the first refrigerant flow switching device 11 and the accumulator 19, and is sucked into the compressor 10 again.

Next, the flow of a heat medium in the heat medium circuit B will be explained.

In the heating main operation mode, the intermediate heat exchanger 25b transmits the heating energy of a heat-source-side refrigerant to a heat medium, and the pump 31b allows the heated heat medium to flow through the pipes 5. Furthermore, in the heating main operation mode, the intermediate heat exchanger 25a transmits the cooling energy of a heat-source-side refrigerant to a heat medium, and the pump 31a allows the cooled heat medium to flow through the pipes 5. A heat medium for cooling and a heat medium for heating that have been pressurized by and flowed out of the pump 31a and the pump 31b pass through the second heat medium flow switching devices 33 connected to the corresponding indoor units 3 that perform cooling and heating, and flow into the use-side heat exchangers 35 for cooling and heating. The flow rates of the flows of heat medium flowing into the use-side heat exchangers 35 are adjusted by the heat medium flow control devices 34.

The use-side heat exchangers 35 of the indoor units 3 perform heating or cooling for the indoor space 7 by heat exchange between a heat medium and indoor air. The flows of heat medium that have been subjected to heat exchange by the use-side heat exchangers 35 pass through the pipes 5, and flow from the indoor units 3 to the relay unit 2. The flows of heat medium that have flowed into the relay unit 2 pass through the heat medium flow control devices 34, and then flow into the first heat medium flow switching devices 32. The first heat medium flow switching devices 32 allow a heat medium used in a heating operation mode to flow into the intermediate heat exchanger 25b functioning for heating, and allow a heat medium used in a cooling operation mode to flow into the intermediate heat exchanger 25a functioning as a device for cooling. After heat exchange between each of the flows of heat medium and a heat-source-side refrigerant is performed, the flows of heat medium are sucked into the pump 31a and the pump 31b again.

As described above, in the heating only operation mode or the heating main operation mode, the heat-source-side heat exchanger 12 within the outdoor unit 1 functions as an evaporator and exchanges heat with outside air. Therefore, in the case where the temperature of the outdoor space 6 is low, the evaporating temperature of the heat-source-side heat exchanger 12 becomes lower, and moisture in outside air may form frost on the surface of the heat-source-side heat exchanger 12. Thus, the heat exchange performance may be degraded. Under such circumstances, for example, the air-conditioning apparatus 100 is configured to be capable of detecting the evaporating temperature and capable of executing a defrosting operation mode (a first defrosting operation mode and a second defrosting operation mode explained later) for removing frost deposited on the surface of the heat-source-side heat exchanger 12 when the detected evaporating temperature is too low.

[First Defrosting Operation Mode]

Figure 5:
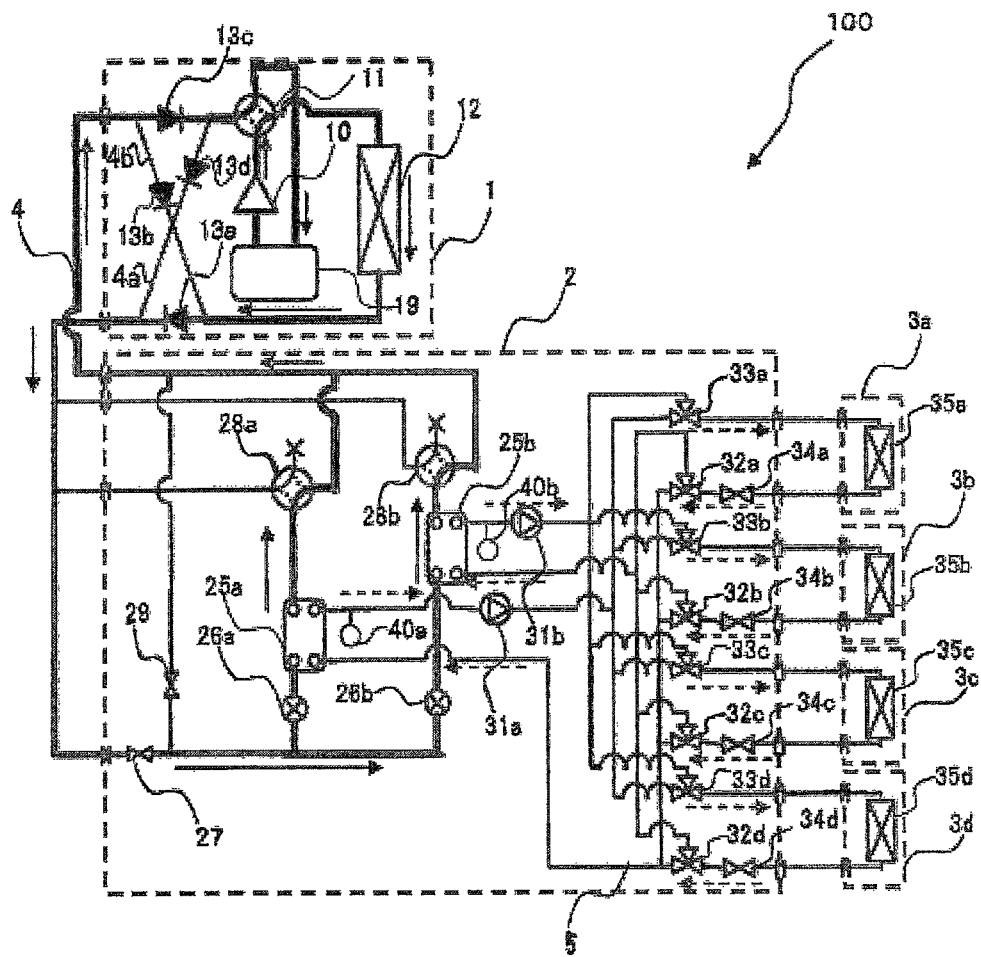
FIG. 5 is a refrigerant circuit diagram illustrating the flow of a refrigerant when the air-conditioning apparatus according to Embodiment 1 of the present invention is in a first defrosting operation mode which is executed from the heating only operation mode.

FIG. 5 is a refrigerant circuit diagram illustrating the flow of a refrigerant in a first defrosting operation mode which is executed from the heating only operation mode of the air-conditioning apparatus 100. As described above, in the case where moisture in outside air forms frost on the heat-source-side heat exchanger 12 in the outdoor unit 1 in the heating only operation mode and the evaporating temperature decreases, the air-conditioning apparatus 100 is capable of performing a defrosting operation for removing frost deposited on the surface of the heat-source-side heat exchanger 12. The air-conditioning apparatus 100 according to this embodiment is capable of executing, as a defrosting operation, the first defrosting operation mode and a second defrosting operation mode, which will be described later. In FIG. 5, the refrigerant pipes 4 expressed by thick lines represent the flow of a heat-source-side refrigerant in the first defrosting operation mode. Furthermore, in FIG. 5, the direction of the flow of the heat-source-side refrigerant is expressed by solid-line arrows, and the direction of the flow of a heat medium is expressed by broken-line arrows.

In the case of the first defrosting operation mode illustrated in FIG. 5, the outdoor unit 1 performs switching for the first refrigerant flow switching device 11 in such a manner that a heat-source-side refrigerant discharged from the compressor 10 directly flows into the heat-source-side heat exchanger 12.

In the relay unit 2, the second refrigerant flow switching device 28a and the second refrigerant flow switching device 28b are switched to the cooling side, the pump 31a and the pump 31b are driven, and the heat medium flow control devices 34 are fully opened, so that a heat medium circulates between the intermediate heat exchanger 25a and each of the use-side heat exchangers 35 and between the intermediate heat exchanger 25b and each of the use-side heat exchangers 35. The expansion device 26a and the expansion device 26b are fully opened, the opening/closing device 27 is opened, and the opening/closing device 29 is closed.

The opening degrees of the second heat medium flow switching devices 33 are adjusted to intermediate opening degrees or to opening degrees corresponding to the heat medium temperature at the exit of the intermediate heat exchanger 25a and the intermediate heat exchanger 25b so that flows of heat medium conveyed from both the intermediate heat exchanger 25a and the intermediate heat exchanger 25b can be supplied to the heat medium flow control devices 34 and the indoor units 3. Furthermore, the opening degrees of the first heat medium flow switching devices 32 are adjusted in the same manner as the second heat medium flow switching devices 33.

The flow of a heat-source-side refrigerant in the refrigerant circuit A in the first defrosting operation mode which is executed from the heating only operation mode will be explained below.

A low-temperature, low-pressure refrigerant is compressed by the compressor 10 and is discharged as a high-temperature, high-pressure gas refrigerant. The high-temperature, high-pressure gas refrigerant discharged from the compressor 10 passes through the first refrigerant flow switching device 11 and flows into the heat-source-side heat exchanger 12. Then, the high-temperature, high-pressure gas refrigerant is subjected to heat exchange with a frost formation part on the heat-source-side heat exchanger 12, and is condensed and liquefied into a low-temperature and high-pressure liquid refrigerant. At this time, frost deposited on the surface of the heat-source-side heat exchanger 12 is melted. The low-temperature and high-pressure liquid refrigerant that has flowed out of the heat-source-side heat exchanger 12 passes through the check valve 13a, flows out of the outdoor unit 1, passes through the refrigerant pipe 4, and flows into the relay unit 2.

The high-pressure liquid refrigerant that has flowed into the relay unit 2 passes through the opening/closing device 27, and is split out. The split flows of refrigerant pass through the expansion device 26a and the expansion device 26b, and flow into the intermediate heat exchanger 25a and the intermediate heat exchanger 25b. The flows of high-pressure liquid-state refrigerant are subjected to heat exchange with flows of heat medium that have been being used for heating until then in the intermediate heat exchanger 25a and the intermediate heat exchanger 25b, and become high in temperature. The flows of refrigerant pass through the second refrigerant flow switching device 28a and the second refrigerant flow switching device 28b, flow through the refrigerant pipes 4, and are conveyed to the outdoor unit 1. The high-temperature refrigerant that has been conveyed to the outdoor unit 1 passes through the check valve 13c, and flows through the first refrigerant flow switching device 11. Then, the refrigerant is guided into the accumulator 19, and is then returned to the compressor 10.

Next, the flow of a heat medium in the heat medium circuit B in the first defrosting operation mode which is executed from the heating only operation mode will be explained.

In the first defrosting operation mode, both the intermediate heat exchanger 25a and the intermediate heat exchanger 25b transmit the cooling energy of heat-source-side flows of refrigerant to flows of heat medium, and the pump 31a and the pump 31b allow the cooled flows of heat medium to flow through the pipes 5. The flows of heat medium that have been pressurized by and flowed out of the pump 31a and the pump 31b pass through the second heat medium flow switching devices 33a to 33d, flow through the use-side heat exchangers 35a to 35d, and flow out of the indoor units 3.

The flows of heat medium out of the indoor unit 3 pass through the pipes 5, the heat medium flow control devices 34, and the first heat medium flow switching devices 32, and flow into the intermediate heat exchanger 25a and the intermediate heat exchanger 25b. The flows of heat medium that have flowed into the intermediate heat exchanger 25a and the intermediate heat exchanger 25b are subjected to heat exchange with a heat-source-side refrigerant again. The flows of heat medium supply a heat quantity to the heat-source-side refrigerant, and then are sucked into the pump 31a and the pump 31b again.

Figure 6:
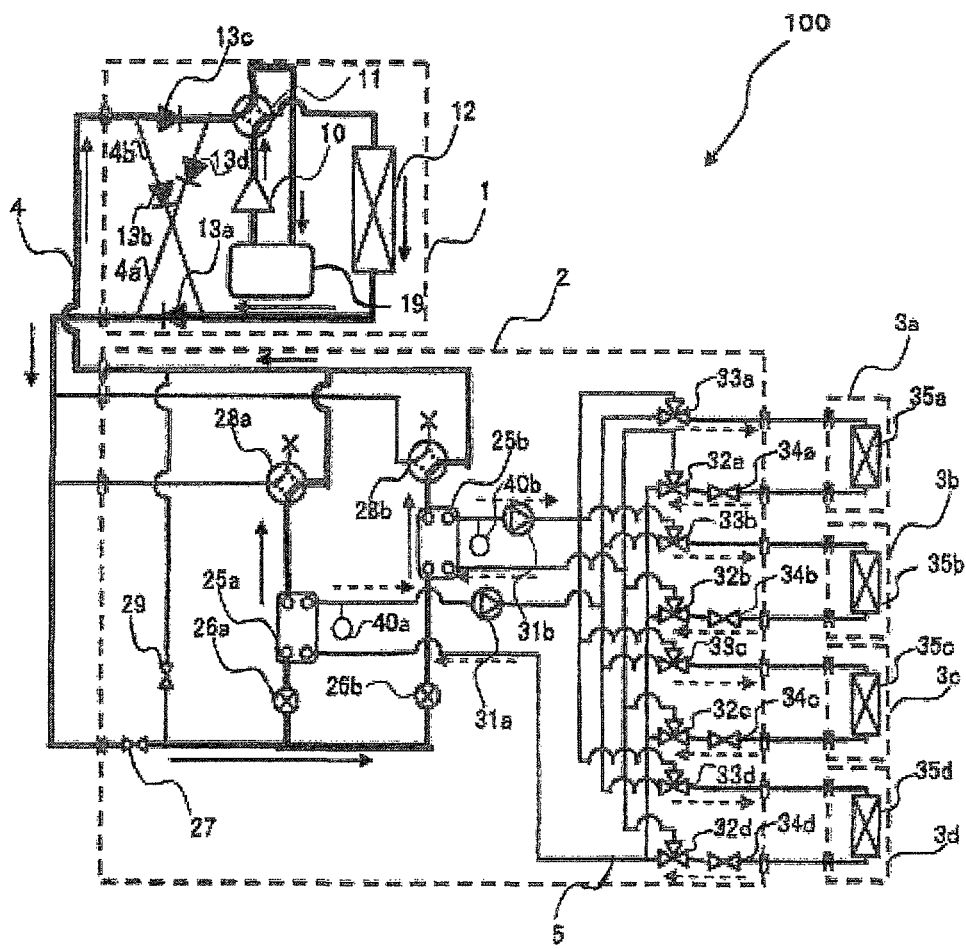
FIG. 6 is a refrigerant circuit diagram illustrating the flow of a refrigerant when the air-conditioning apparatus according to Embodiment 1 of the present invention is in the first defrosting operation mode which is executed from the heating main operation mode.

FIG. 6 is a refrigerant circuit diagram illustrating the flow of a refrigerant in the first defrosting operation mode which is executed from the heating main operation mode of the air-conditioning apparatus 100. FIG. 6 itself is equal to FIG. 5. As described above, in the case where moisture in outside air forms frost on the heat-source-side heat exchanger 12 in the outdoor unit 1 in the heating main operation mode and the evaporating temperature decreases, the air-conditioning apparatus 100 is capable of performing an operation (first defrosting operation mode) for removing frost deposited on the surface of the heat-source-side heat exchanger 12. In FIG. 6, the refrigerant pipes 4 expressed by thick lines represent the flow of a heat-source-side refrigerant in the first defrosting operation mode. Furthermore, in FIG. 6, the direction of the flow of the heat-source-side refrigerant is expressed by solid-line arrows, and the direction of the flow of a heat medium is expressed by broken-line arrows.

In the case of the first defrosting operation mode illustrated in FIG. 6, the outdoor unit 1 performs switching for the first refrigerant flow switching device 11 in such a manner that a heat-source-side refrigerant discharged from the compressor 10 directly flows into the heat-source-side heat exchanger 12.

In the relay unit 2, the second refrigerant flow switching device 28a and the second refrigerant flow switching device 28b are switched to the cooling side, the pump 31a and the pump 31b are driven, and the opening degrees of the heat medium flow control devices 34 are controlled to adjust the flow rate on the basis of a difference between the temperature immediately before the pump 31a and the temperature at the exit of the connected indoor units, so that a heat medium circulates between the intermediate heat exchanger 25a and each of the use-side heat exchangers 35 and between the intermediate heat exchanger 25b and each of the use-side heat exchangers 35. The opening degree of the expansion device 26a is controlled such that a refrigerant at the exit of the intermediate heat exchanger 25a is in a gas state, and the opening degree of the expansion device 26b is controlled to be almost fully opened. The opening/closing device 27 is opened, and the opening/closing device 29 is closed.

The control of the second heat medium flow switching devices 33 and the first heat medium flow switching devices 32 will be described later.

The flow of a heat-source-side refrigerant in the refrigerant circuit A in the first defrosting operation mode which is executed from the heating main operation mode will be explained.

A low-temperature, low-pressure refrigerant is compressed by the compressor 10 and is discharged as a high-temperature, high-pressure gas refrigerant. The high-temperature, high-pressure gas refrigerant discharged from the compressor 10 passes through the first refrigerant flow switching device 11 and flows into the heat-source-side heat exchanger 12. Then, the high-temperature, high-pressure gas refrigerant is subjected to heat exchange with a frost formation part on the heat-source-side heat exchanger 12, and is condensed and liquefied into a low-temperature and high-pressure liquid refrigerant. At this time, frost deposited on the surface of the heat-source-side heat exchanger 12 is melted. The low-temperature and high-pressure liquid refrigerant that has flowed out of the heat-source-side heat exchanger 12 passes through the check valve 13a, flows out of the outdoor unit 1, passes through the refrigerant pipe 4, and flows into the relay unit 2.

The high-pressure liquid refrigerant that has flowed into the relay unit 2 passes through the opening/closing device 27, and is split out. The split flows of refrigerant pass through the expansion device 26a and the expansion device 26b, and flow into the intermediate heat exchanger 25a and the intermediate heat exchanger 25b. The high-pressure liquid refrigerant is subjected to heat exchange with a heat medium that has been being used for heating until then in the intermediate heat exchanger 25b, and become high in temperature. The refrigerant passes through the second refrigerant flow switching device 28b, flows through the intermediate heat exchanger 25a, and is subjected to heat exchange with a heat medium that has been being used by a cooling operation, merges with a low-temperature refrigerant that has passed through the second refrigerant flow switching device 28a, passes through the refrigerant pipe 4, and is conveyed to the outdoor unit 1. The refrigerant that has been conveyed to the outdoor unit 1 passes through the check valve 13c, and flows through the first refrigerant flow switching device 11. Then, the refrigerant is guided into the accumulator 19, and is then returned to the compressor 10.

Next, the flow of a heat medium in the heat medium circuit B in the first defrosting operation mode which is executed from the heating main operation mode will be explained.

In the first defrosting operation mode in the heating main operation mode, the intermediate heat exchanger 25a transmits the cooling energy of a heat-source-side refrigerant to a heat medium, and the pump 31a causes the cooled heat medium to flow through the pipe 5. Furthermore, in the first defrosting operation mode in the heating main operation mode, the pump 31b allows a heat medium that has become low in temperature in the intermediate heat exchanger 25b to flow through the pipe 5. The flows of heat medium that have been pressurized by and flowed out of the pump 31a and the pump 31b pass through the second heat medium flow switching devices 33 connected to the individual indoor units 3, and flow into the use-side heat exchangers 35. The flow rates of the flows of heat medium that have flowed into the use-side heat exchangers 35 are controlled by the heat medium flow control devices 34.

At this time, a second heat medium flow switching device 33 is switched to the direction in which the intermediate heat exchanger 25b and the pump 31b are connected when a connected indoor unit 3 executes a heating operation mode, and is switched to the direction in which the intermediate heat exchanger 25a and the pump 31a are connected when a connected indoor unit 3 executes a cooling operation mode. That is, switching is performed according to the operation mode of the indoor unit 3 in such a manner that cold water continues to be supplied or switching is performed in such a manner that a heat medium that has been subjected to heat exchange with a low-temperature refrigerant in the intermediate heat exchanger 25b is newly supplied to an indoor unit 3 to which hot water has been being supplied until then.

A heat medium that has flowed into an indoor unit 3 through the pump 31a continues to perform a cooling operation by exchanging heat with indoor air in the indoor space 7 by the corresponding use-side heat exchanger 35, for the indoor unit 3 that has been performing a cooling operation until then. The heat medium that has been subjected to heat exchange in the use-side heat exchanger 35 flows out of the indoor unit 3, and flows into the relay unit 2. The heat medium that has flowed into the relay unit 2 is conveyed to the corresponding heat medium flow control device 34.

Then, the heat medium flows into the corresponding first heat medium flow switching device 32. The first heat medium flow switching device 32 is switched to the direction in which the intermediate heat exchanger 25a is connected. The heat medium that has been allowed to pass through a second heat medium flow switching device 33 by the pump 31b and that has flowed into the corresponding indoor unit 3 connected by the pipe 5 passes through the corresponding use-side heat exchanger 35 of the indoor unit 3 that has been performing a cooling operation until then, passes through the pipe 5, the corresponding heat medium flow control device 34, and the corresponding first heat medium flow switching device 32, and is conveyed into the relay unit 2.

At this time, the first heat medium flow switching device 32 is switched to the direction in which the intermediate heat exchanger 25b is connected. Accordingly, a heat medium used in the heating operation mode may be caused to flow into the intermediate heat exchanger 25b to which a refrigerant that has become low in temperature by the defrosting operation in the outdoor unit 1 is conveyed, and a heat medium used in the cooling operation mode may be caused to flow into the intermediate heat exchanger 25a in which a refrigerant receives heat for cooling. After being subjected to heat exchange with flows of refrigerant, the flows of heat medium are conveyed to the pump 31a and the pump 31b.

The indoor unit 3 that has been performing a heating operation in the first defrosting operation mode in the heating only operation mode or the heating main operation mode until then receives information indicating that the outdoor unit 1 is in a defrosting operation mode, and stops an air-sending device (indoor fan) which is not illustrated. That is, supply of a use-side medium (for example, air, water, or the like) to the use-side heat exchanger 35 in the indoor unit 3 that has been performing a heating operation until then is stopped. Furthermore, the indoor unit 3 that has been performing a cooling operation operates an air-sending device which is not illustrated. That is, supply of a use-side medium to the use-side heat exchanger 35 in the indoor unit 3 that has been performing a cooling operation continues.

However, in the case where the indoor air temperature and the discharge air temperature of an indoor unit can be detected, there will be no problem in continuing the operation of the air-sending device unless the discharge air temperature of the indoor unit is below the indoor air temperature. Furthermore, by providing heat medium temperature detecting devices (temperature sensors 40) at flow passages on the exit side of the intermediate heat exchangers 25, the operation of the air-sending device may continue to be performed as long as the heat medium temperature at the exit of the intermediate heat exchangers 25 is not below the indoor air temperature.

By exchanging heat with flows of heat medium in the intermediate heat exchanger 25a and the intermediate heat exchanger 25b in the relay unit 2 during execution of the first defrosting operation mode, a heat quantity supplied from a heat medium to the heat-source-side refrigerant side can be supplied to the heat-source-side heat exchanger 12 of the outdoor unit 1, thus the melting time of the formed frost being shortened.

[Second Defrosting Operation Mode]

Figure 7:
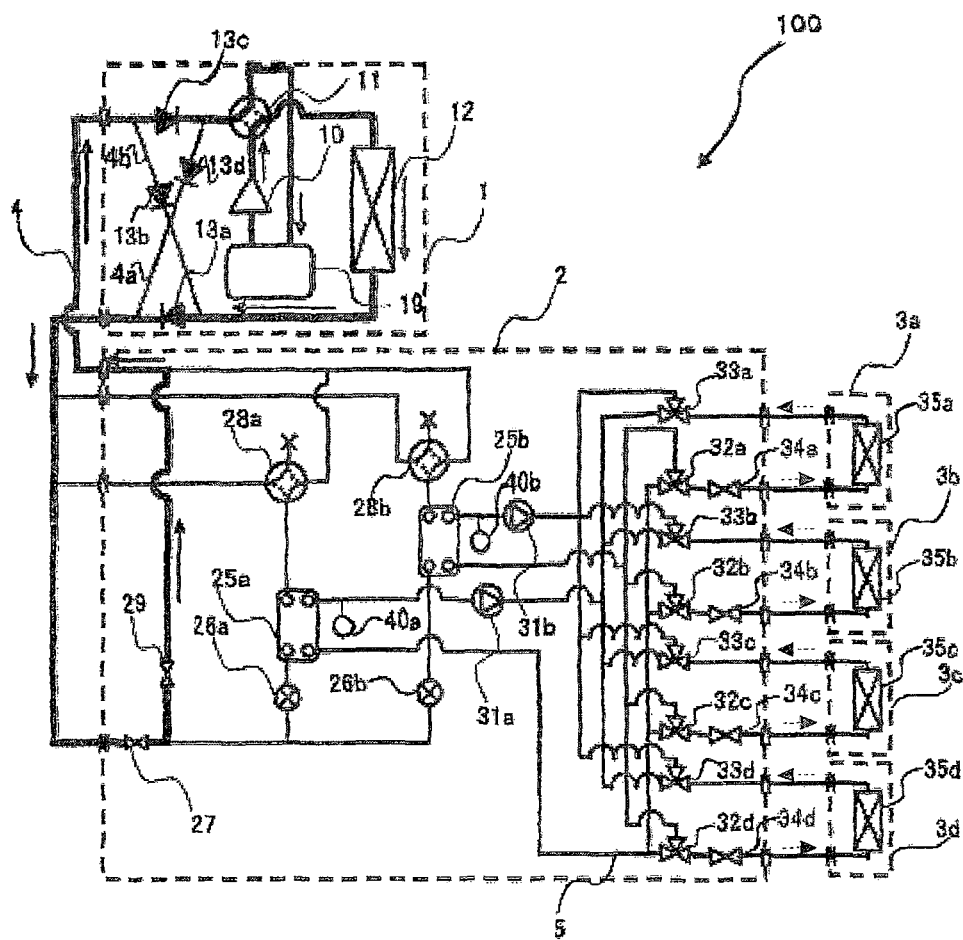
FIG. 7 is a refrigerant circuit diagram illustrating the flow of a refrigerant when the air-conditioning apparatus according to Embodiment 1 of the present invention is in a second defrosting operation mode which is executed from the heating only operation mode.

FIG. 7 is a refrigerant circuit diagram illustrating the flow of a refrigerant in a second defrosting operation mode which is executed from the heating only operation mode of the air-conditioning apparatus 100. As described above, the air-conditioning apparatus 100 is capable of performing a defrosting operation in which a heat quantity is not recovered from a heat medium (second defrosting operation mode), from the heating only operation mode. In FIG. 7, the refrigerant pipes 4 expressed by thick lines represent the flow of a heat-source-side refrigerant in the second defrosting operation mode. Furthermore, in FIG. 7, the direction of the flow of the heat-source-side refrigerant is expressed by solid-line arrows, and the direction of the flow of a heat medium is expressed by broken-line arrows.

In the case of the second defrosting operation mode illustrated in FIG. 7, the outdoor unit 1 performs switching for the first refrigerant flow switching device 11 in such a manner that a heat-source-side refrigerant discharged from the compressor 10 directly flows into the heat-source-side heat exchanger 12.

In the relay unit 2, both the second refrigerant flow switching device 28a and the second refrigerant flow switching device 28b are maintained in the state in the first defrosting operation mode until then, and the pump 31a and the pump 31b are stopped, so that a heat medium does not circulate. The expansion device 26a and the expansion device 26b are fully closed, the opening/closing device 27 is opened, and the opening/closing device 29 is opened. That is, a heat source side does not convey the refrigerant to the intermediate heat exchanger 25a or the intermediate heat exchanger 25b.

The opening degrees of the second heat medium flow switching devices 33 are adjusted to intermediate opening degrees. Furthermore, the opening degrees of the first heat medium flow switching devices 32 are adjusted in the same manner as the second heat medium flow switching devices 33. Furthermore, the heat medium flow control devices 34 are fully closed.

The flow of a heat-source-side refrigerant in the refrigerant circuit A in the second defrosting operation mode which is executed from the heating only operation mode will be explained.

A low-temperature, low-pressure refrigerant is compressed by the compressor 10 and is discharged as a high-temperature, high-pressure gas refrigerant. The high-temperature, high-pressure gas refrigerant discharged from the compressor 10 passes through the first refrigerant flow switching device 11 and flows into the heat-source-side heat exchanger 12. Then, the high-temperature, high-pressure gas refrigerant is subjected to heat exchange with a frost formation part on the heat-source-side heat exchanger 12, and is condensed and liquefied into a low-temperature and high-pressure liquid refrigerant. At this time, frost deposited on the surface of the heat-source-side heat exchanger 12 is melted. The low-temperature and high-pressure liquid refrigerant that has flowed out of the heat-source-side heat exchanger 12 passes through the check valve 13a, flows out of the outdoor unit 1, passes through the refrigerant pipe 4, and flows into the relay unit 2.

The high-pressure liquid refrigerant that has flowed into the relay unit 2 passes through the opening/closing device 27, and then passes through the opening/closing device 29. The refrigerant that has passed through the opening/closing device 29 is directly conveyed outside the relay unit 2, passes through the refrigerant pipe 4, and flows into the outdoor unit 1. The low-temperature and high-pressure refrigerant that has been conveyed to the outdoor unit 1 passes through the check valve 13c and the first refrigerant flow switching device 11, is guided into the accumulator 19, and is returned to the compressor 10.

Next, the flow of a heat medium in the heat medium circuit B in the second defrosting operation mode which is executed from the heating only operation mode will be explained. Regarding a heat medium, as described later, in order to avoid freezing or the like, the heat medium is caused to circulate.

Figure 8:
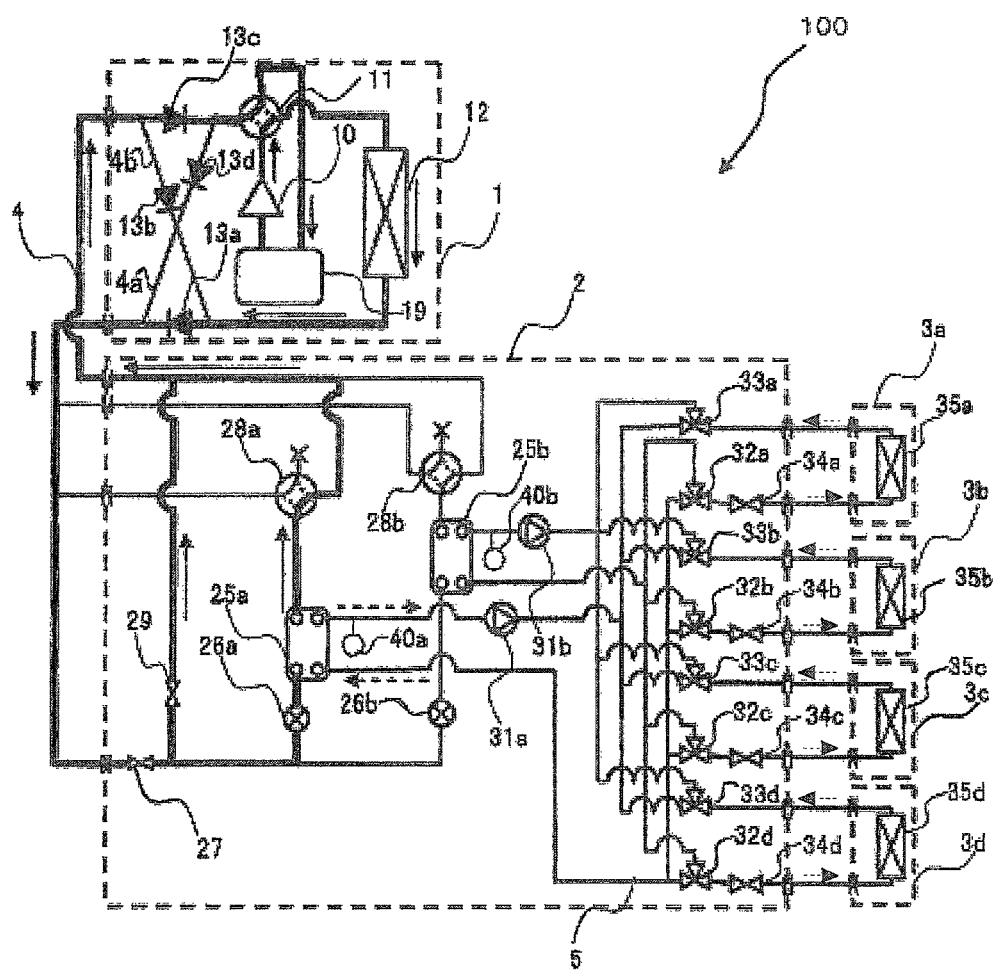
FIG. 8 is a refrigerant circuit diagram illustrating the flow of a refrigerant when the air-conditioning apparatus according to Embodiment 1 of the present invention is in the second defrosting operation mode which is executed from the heating main operation mode.

FIG. 8 is a refrigerant circuit diagram illustrating the flow of a refrigerant in the second defrosting operation mode which is executed from the heating main operation mode of the air-conditioning apparatus 100. As described above, the air-conditioning apparatus 100 is capable of executing the second defrosting operation mode from the heating main operation mode. In FIG. 8, the refrigerant pipes 4 expressed by thick lines represent the flow of a heat-source-side refrigerant in the second defrosting operation mode. Furthermore, in FIG. 8, the direction of the flow of the heat-source-side refrigerant is expressed by solid-line arrows, and the direction of the flow of a heat medium is expressed by broken-line arrows.

In the case of the second defrosting operation mode illustrated in FIG. 8, the outdoor unit 1 performs switching for the first refrigerant flow switching device 11 in such a manner that a heat-source-side refrigerant discharged from the compressor 10 directly flows into the heat-source-side heat exchanger 12.

In the relay unit 2, both the second refrigerant flow switching device 28a and the second refrigerant flow switching device 28b are maintained in the state in the first defrosting operation mode that has been performed until then. The pump 31a is driven, the pump 31b is stopped, and the opening degrees of the heat medium flow control devices 34 are controlled to adjust the flow rate on the basis of a difference between the temperature immediately before the pump 31a and the temperature at the exit of the connected indoor units, so that a heat medium circulates between the intermediate heat exchanger 25a and each of the use-side heat exchangers 35. The opening degree of the expansion device 26a is controlled such that a refrigerant at the exit of the intermediate heat exchanger 25a is in a gas state, and the opening degree of the expansion device 26b is controlled to be almost fully closed. The opening/closing device 27 is opened, and the opening/closing device 29 is opened.

The control of the second heat medium flow switching devices 33 and the first heat medium flow switching devices 32 as well as the flow of a heat medium will be described.

The flow of a heat-source-side refrigerant in the refrigerant circuit A in the second defrosting operation mode which is executed from the heating main operation mode will be explained.

A low-temperature, low-pressure refrigerant is compressed by the compressor 10 and is discharged as a high-temperature, high-pressure gas refrigerant. The high-temperature, high-pressure gas refrigerant discharged from the compressor 10 passes through the first refrigerant flow switching device 11 and flows into the heat-source-side heat exchanger 12. Then, the high-temperature, high-pressure gas refrigerant is subjected to heat exchange with a frost formation part on the heat-source-side heat exchanger 12, and is condensed and liquefied into a low-temperature and high-pressure liquid refrigerant. At this time, frost deposited on the surface of the heat-source-side heat exchanger 12 is melted. The low-temperature and high-pressure liquid refrigerant that has flowed out of the heat-source-side heat exchanger 12 passes through the check valve 13a, flows out of the outdoor unit 1, passes through the refrigerant pipe 4, and flows into the relay unit 2.

The high-pressure liquid refrigerant that has flowed into the relay unit 2 passes through the opening/closing device 27, and is split out. A part of the split flows of refrigerant flows into the opening/closing device 29, and another part of the split flows of refrigerant flows into the expansion device 26a. Thus, although the intermediate heat exchanger 25a continues heat exchange with a heat medium, the intermediate heat exchanger 25b does not exchange heat with a heat medium. The refrigerant that has passed through the opening/closing device 29 is subjected to heat exchange in the intermediate heat exchanger 25a, and merges with a flow of refrigerant that has passed through the second refrigerant flow switching device 28a. The merged refrigerant is conveyed outside the relay unit 2, passes through the refrigerant pipe 4, and flows into the outdoor unit 1. The refrigerant that has been conveyed to the outdoor unit 1 passes through the check valve 13c and the first refrigerant flow switching device 11, is guided into the accumulator 19, and is returned to the compressor 10.

Next, the flow of a heat medium in the heat medium circuit B in the second defrosting operation mode which is executed from the heating main operation mode will be explained.

In the second defrosting operation mode in the heating main operation mode, the intermediate heat exchanger 25a transmits the cooling energy of a heat-source-side refrigerant to a heat medium, and the pump 31a allows the cooled heat medium to flow through the pipe 5. The heat medium that has been pressurized by and flowed out of the pump 31a passes through the second heat medium flow switching devices 33 connected to the individual indoor units 3, and flows into the use-side heat exchangers 35. The flow rate of the heat medium that has flowed into the use-side heat exchangers 35 is controlled by the heat medium flow control devices 34.

At this time, a second heat medium flow switching device 33 is switched to the direction in which the intermediate heat exchanger 25b and the pump 31b are connected when a connected indoor unit 3 executes a heating operation mode, and is switched to the direction in which the intermediate heat exchanger 25a and the pump 31a are connected when a connected indoor unit 3 executes a cooling operation mode. The heat medium that has flowed into the indoor unit 3 through the pump 31a continues a cooling operation by being subjected to heat exchange with indoor air in the indoor space 7 by a use-side heat exchanger 35, for the indoor unit 3 that has been performing a cooling operation until then.

The heat medium that has been subjected to heat exchange in the use-side heat exchanger 35 flows out of the indoor unit 3, and flows into the relay unit 2. The heat medium that has flowed into the relay unit 2 is conveyed to the corresponding heat medium flow control device 34.

Then, the heat medium flows into the corresponding first heat medium flow switching device 32. The first heat medium flow switching device 32 is switched to the direction in which the intermediate heat exchanger 25a is connected. The heat medium that has been allowed to pass through the second heat medium flow switching device 33 by the pump 31b and that has flowed into the indoor unit 3 connected by the pipe 5 passes through the corresponding use-side heat exchanger 35 of the indoor unit 3 that has been performing a heating operation until then, passes through the pipe 5, the corresponding heat medium flow control device 34, and the corresponding first heat medium flow switching device 32, and is conveyed into the relay unit 2.

At this time, the first heat medium flow switching device 32 is switched to the direction in which the intermediate heat exchanger 25a is connected. In contrast, as will be described later, the pump 31b operates to avoid freezing, and causes a heat medium to circulate. The second heat medium flow switching device 33 connected to the indoor unit 3 that has been performing a heating operation until then has been switched to the direction in which the pump 31b is connected. Furthermore, the heat medium flow control device 34 that is connected to the indoor unit 3 that has been executing a heating operation mode is fully closed, and the opening degree of the first heat medium flow switching device 32 is set to be equal to the opening degree of the second heat medium flow switching device 33.

Figure 9:
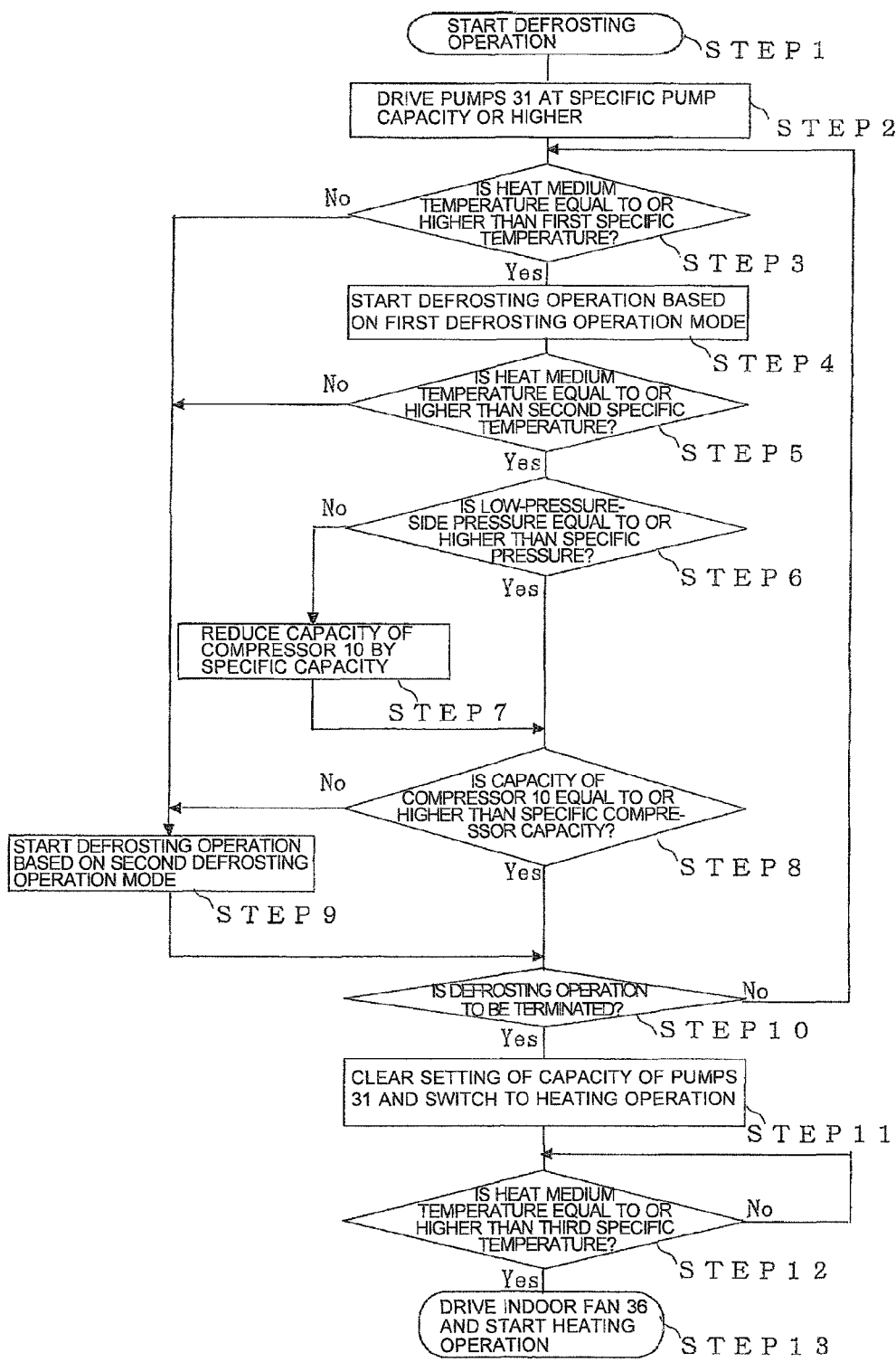
FIG. 9 is a flowchart illustrating a process for a defrosting operation according to Embodiment 1 of the present invention.

FIG. 9 is a diagram illustrating a flowchart of a process according to a defrosting operation. Next, a process performed by the controller 60 during a period from start of a defrosting operation to start of a heating operation will be explained.

In STEP 1, when it is determined that conditions for starting a defrosting operation are satisfied, switching of the first refrigerant flow switching device 11 is performed, and a defrosting operation for defrosting the heat-source-side heat exchanger 12 in the refrigerant circuit A is performed.

In STEP 2, the pumps 31 in the heat medium circuit B are driven to achieve a specific pump capacity (rotation speed) or higher. For example, before starting a defrosting operation, in the case where only an indoor unit 3 that includes a use-side heat exchanger 35 having a small capacity is operating and the flow rate of a heat medium is small, the pumps 31 are driven at a specific pump capacity. If the pumps 31 are driven at the specific pump capacity or higher, for example, in order to maintain supply of a heat quantity to the indoor unit 3 side or the like, the pumps 31 are driven at the same capacity. The specific pump capacity corresponds to a capacity which achieves by circulation, a flow rate at which a heat medium does not freeze. By driving the pumps 31 at the specific pump capacity, the flow rate of a heat medium during a defrosting operation can be ensured, and the heat medium can be prevented from freezing. In particular, in a defrosting operation based on the first defrosting operation mode, due to a decrease in a heat medium temperature by heating a heat-source-side refrigerant, freezing is likely to occur. However, the freezing can be avoided. Furthermore, a specific quantity or more of heat supplied to the heat-source-side refrigerant may be ensured.

In STEP 3, it is determined whether or not the heat medium temperature is equal to or greater than a first specific temperature. The first specific temperature may be set equal to or greater than a temperature at which, for example, a heat-source-side refrigerant can be effectively heated when the pumps 31 are driven at the specific pump capacity. Furthermore, although a comparison is made between the temperature on the heat medium exit side of the intermediate heat exchangers 25 detected by the temperature sensors 40 and the first specific temperature, detection of the heat medium temperature may be performed at a different position. When it is determined that the heat medium temperature is equal to or greater than the first specific temperature, the process proceeds to STEP 4. When it is determined that the heat medium temperature is lower than the first specific temperature (below the first specific temperature), in order to perform a defrosting operation in the second defrosting operation mode, instead of the first defrosting operation mode, the process proceeds to STEP 9.

In STEP 4, the defrosting operation based on the first defrosting operation mode starts, and the process proceeds to STEP 5. In STEP 5, it is determined whether or not the heat medium temperature detected by the temperature sensors 40 is equal to or greater than a second specific temperature. When it is determined that the detected heat medium temperature is equal to or greater than the second specific temperature, it is determined that there is no possibility of occurring freezing or the like. The process proceeds to STEP 6, and a defrosting operation based on the first defrosting operation mode continues. When it is determined that the heat medium temperature is not equal to or greater than the second specific temperature (below the second specific temperature), there is a possibility of the heat medium freezing or the like. Therefore, the defrosting operation based on the first defrosting operation mode is stopped, and the process proceeds to STEP 9. Here, for example, the second specific temperature needs to be set equal to or greater than a temperature at which freezing occurs due to outside air temperature or the like. Furthermore, for stopping of the first defrosting operation mode, if the flow of the heat medium in the heat medium circuit B is stopped immediately after the stopping of the first defrosting operation mode, a liquid refrigerant remaining in a refrigerant-side flow of the intermediate heat exchangers 25 may cause the heat medium to freeze. Thus, the operation of the pumps 31 continues to be performed for a period of time immediately after the defrosting operation based on the first defrosting operation mode is stopped, and the pumps 31 are then stopped. Here, the pumps 31 may be driven at the same capacity as the defrosting operation based on the first defrosting operation mode. Alternatively, the pumps 31 may be driven at a capacity lower than the defrosting operation based on the first defrosting operation mode, so that power consumption may be reduced.

In STEP 6, it is determined whether or not the low-pressure-side pressure based on detection by the refrigerant pressure sensor 41 is equal to or greater than a specific pressure. When it is determined that the low-pressure-side pressure is equal to or greater than the specific pressure, the process proceeds to STEP 8. When it is determined that the low-pressure-side pressure is lower than the specific pressure (the low-pressure-side pressure is below the specific pressure), since there is a possibility of freezing by heat exchange in the intermediate heat exchangers 25, the process proceeds to STEP 7. In STEP 7, the frequency of the compressor 10 is reduced by a specific frequency to reduce the capacity of the compressor by a specific capacity, and the pressure on the low-pressure side is increased). Then, the cooling temperature (evaporating temperature) in a heat-source-side refrigerant in the intermediate heat exchangers 25 is increased, and an operation is performed in such a manner that the heat medium is prevented from freezing.

In STEP 8, it is determined whether or not the capacity (frequency) of the compressor 10 is equal to or greater than a specific compressor capacity (frequency). When it is determined that the capacity of the compressor 10 is equal to or greater than the specific compressor capacity, the process proceeds to STEP 10. When it is determined that the capacity of the compressor 10 is lower than the specific compressor capacity (below the specific compressor capacity), it is determined that the heat quantity from the heat medium lacks the defrosting capacity. The defrosting operation based on the first defrosting operation mode is terminated, and the process proceeds to STEP 9.

In STEP 9, the defrosting operation based on the second defrosting operation mode starts.

In STEP 10, it is determined whether or not termination conditions for the defrosting operation are satisfied. When it is determined that the termination conditions are satisfied, the process proceeds to STEP 11. When it is determined that the termination conditions are not satisfied, the process returns to STEP 2 and continues the defrosting operation.

In STEP 11, the defrosting operation is terminated, and switching to a heating operation is performed. At this time, settings for the pumps 31 that have been driven at the specific capacity or higher are cleared. In STEP 12, it is determined whether or not the heat medium temperature detected by the temperature sensors 40 has reached a third specific temperature or higher, while activating the pumps 31 and the compressor 10 to cause the heated heat medium to circulate. At this time, the indoor fan 36 of the indoor unit 3 that performs a heating operation is stopped. When it is determined that the heat medium temperature has reached the third specific temperature or higher, the process proceeds to STEP 13.

In STEP 13, the indoor fan 36 is driven to start a heating operation. By increasing the temperature of the heat medium and then starting heat exchange with indoor air, air at a low temperature, such as cold air, is not blown into the room. Therefore, discomfort of the user can be eliminated or reduced.

As described above, in the air-conditioning apparatus 100 according to this embodiment, in the indoor space 7 in which the indoor units 3 are installed, by exchanging heat between a heat-source-side refrigerant and a heat medium through the relay unit 2, without causing the heat-source-side refrigerant to directly circulate, and conveying the heat medium to the indoor units 3, a cooling operation and a heating operation can be realized. Therefore, refrigerant can be avoided from leaking into the indoor space 7. Furthermore, in the air-conditioning apparatus 100, by conveying the refrigerant from the outdoor unit 1 to the relay unit 2, the relay unit 2 can be installed at an appropriate position, the conveyance distance of the heat medium can be reduced, the power of the pumps 31 can be reduced, and further energy saving can be achieved.

Furthermore, in a defrosting operation mode that is executed during execution of a heating operation at a low outside air temperature, by exchanging heat between the refrigerant that has been subjected to heat exchange by defrosting and that has become low in temperature and the heat medium that has been conveyed to the indoor unit 3 in the heating operation and conveying the refrigerant to the outdoor unit 1, the air-conditioning apparatus 100 may use the heat capacity held by the heat medium for defrosting. Therefore, the defrosting operation time may be shortened.

Furthermore, in the air-conditioning apparatus 100, at the time when heat exchange between the heat medium and the heat-source-side refrigerant is performed, the highest indoor air detection temperature of the indoor unit 3 that has been performing a heating operation until then is compared with the temperature of the heat medium. When it is presumed that the temperature of the heat medium is lower than the highest indoor air detection temperature, by performing switching of the flow on the refrigerant side, heat exchange between the refrigerant and the heat medium can be prevented. Therefore, the temperature of the heat medium can be prevented from being reduced.

Embodiment 2

The second specific temperature in STEP 5 of FIG. 9 explained in Embodiment 1 described above is set to a temperature at which a heat medium does not freeze. However, the second specific temperature may be set to a temperature at which a reduction in the time to supply heated air into the room is achieved when the defrosting operation is switched to the heating operation. In addition, although the heat medium temperature is compared with the second specific temperature in STEP 5, the comparison may be made with the indoor air temperature based on the detection by the indoor temperature sensors 42.

For example, the controller 60 estimates the estimated temperature T of the heat medium for the next period on the basis of the temperature for the last three control periods (the temperature for the last period is represented by T0, the temperature for the period immediately before the last period is represented by T1, and the temperature for the period two periods before the last period is represented by T2) of the temperature of the heat medium (temperature of a heat medium based on detection by the temperature sensors 40a and 40b) conveyed to the indoor unit 3 that has been executing the heating operation mode until then, based on equation (1), and the temperature T is defined as the second specific temperature.

$$T=(T0-T1)\cdot(T0-T1)/(T1-T2)+T0 \qquad (1)$$

Then, the temperature T estimated using equation (1) is compared with the highest indoor air temperature based on the detection by the indoor temperature sensor 42 of the indoor unit 3 that has been executing the heating operation mode until then. As a result, when it is determined that the temperature T estimated using equation (1) is lower than the highest indoor air temperature, the defrosting operation based on the first defrosting operation mode is terminated, and a defrosting operation based on the second defrosting operation mode is performed. By performing the processing described above, the heat medium temperature can be prevented from becoming lower than the indoor air temperature. Therefore, blowing of air in the heating operation can be performed quickly. Here, a comparison between the heat medium temperature and the indoor air temperature may be made by simply determining whether or not the detection temperature T0 of the heat medium is equal to or greater than the highest indoor air temperature without using equation (1), and switching of a refrigerant flow path may be performed.

Furthermore, by providing a setting device, such as a switch, setting or the like of the second specific temperature may be performed in a desired manner by switching or the like. At this time, setting may be performed in accordance with the preference of a user who uses the room.

Embodiment 3

In the foregoing embodiments, at the time of execution of defrosting, if it has become impossible to perform a defrosting operation based on the first defrosting operation mode, a defrosting operation based on the second defrosting operation mode for supplying a high-temperature heat-source-side refrigerant to the heat-source-side heat exchanger 12 is performed. However, the present invention is not limited to this. For example, defrosting using a heating device, such as a heater, for externally heating the heat-source-side heat exchanger 12 may be performed. Even in the case where defrosting using a heating device is performed, the pumps 31 are driven during defrosting in order to try to prevent the heat medium from freezing.

Furthermore, in the foregoing embodiments, in order to achieve a cooling and heating mixed operation or the like, the air-conditioning apparatus 100 includes two or more intermediate heat exchangers 25. However, for example, an air-conditioning apparatus including a single intermediate heat exchanger 25 may also be applied. Furthermore, an air-conditioning apparatus including a single indoor unit 3 may also be applied.

Embodiment 4

In the embodiments, the case where the air-conditioning apparatus 100 includes the accumulator 19 has been explained by way of example. However, the accumulator 19 is not necessarily provided. Furthermore, for example, the heat-source-side heat exchanger 12 often includes an air-sending device mounted therein so that condensation or evaporation is promoted by sending air. However, the heat-source-side heat exchanger 12 is not limited to this. For example, the heat-source-side heat exchanger 12 of a water-cooled type for moving heat by water or antifreeze may also be used. That is, any device having a configuration capable of heat transfer or heat reception may be used as the use-side heat exchangers 35 regardless of the type of a use-side medium.

According to the embodiments, the case where four use-side heat exchangers 35 are provided has been explained by way of example. However, the number of the use-side heat exchangers 35 is not particularly limited. Furthermore, the case where two intermediate heat exchangers 25, the intermediate heat exchanger 25a and the intermediate heat exchanger 25b, are provided has been explained by way of example. Obviously, however, the intermediate heat exchangers 25 are not limited to this. Any number of intermediate heat exchangers 25 may be installed as long as a heat medium can be cooled and/or heated. Furthermore, the number of each of the pumps 31a and the pumps 31b is not limited to one. A plurality of small-capacity pumps may be connected in parallel to each other.

The invention claimed is:

1. An air-conditioning apparatus comprising:
a refrigerant circuit configured by connecting, by pipes, a compressor that compresses a heat-source-side refrigerant, a refrigerant flow switching device for switching a circulation path for the heat-source-side refrigerant, a heat-source-side heat exchanger for causing the heat-source-side refrigerant to be subjected to heat exchange, an expansion device for adjusting a pressure of the heat-source-side refrigerant, and one or more intermediate heat exchangers that exchange heat between the heat-source-side refrigerant and a heat medium different from the heat-source-side refrigerant;
a heat medium circuit configured by connecting, by pipes, one or more pumps for allowing the heat medium subjected to heat exchange by the intermediate heat exchangers to circulate, a use-side heat exchanger that exchanges heat between the heat medium and air in an air-conditioning target space, and a flow switching device that switches, for the use-side heat exchanger, between passage of a heated heat medium and passage of a cooled heat medium;
an indoor fan; and
a controller that
performs, at a time when a heat recovery defrosting operation for causing the heat-source-side refrigerant that has been heated by the heat medium in the intermediate heat exchangers to flow into the heat-source-side heat exchanger and performing defrosting is performed,
control such that the pumps are driven at a specific pump capacity or higher, wherein the specific pump capacity at which the pumps are driven while performing defrosting maintains supply of a heat quantity to an indoor unit, and the specific pump capacity at which the pumps are driven while performing defrosting corresponds to a capacity which achieves by circulation, a flow rate at which the heat medium does not freeze;
the controller is further configured to, responsive to the performing of defrosting being terminated and switching to a heating operation,
control the indoor fan to be stopped, and
then drive the indoor fan to start when a temperature of the heat medium which is heated is determined to reach a third specific temperature or higher such that cold air is not blown by the indoor fan.

2. The air-conditioning apparatus of claim 1,
wherein in the heat recovery defrosting operation, when it is determined that a low-pressure-side pressure of the refrigerant circuit has become lower than a specific pressure, the controller reduces a compressor capacity of the compressor.

3. The air-conditioning apparatus of claim 2,
wherein in the heat recovery defrosting operation, when it is determined that the compressor capacity of the compressor has reached a specific compressor capacity or lower or that the temperature of the heat medium has reached a specific temperature or lower, the controller performs control such that a defrosting operation in which the heat-source-side refrigerant is not heated by the heat medium is performed.

4. The air-conditioning apparatus of claim 3,
wherein the controller performs control for driving the pumps even while the defrosting operation in which the heat-source-side refrigerant is not heated by the heat medium is being performed.

5. The air-conditioning apparatus of claim 3, further comprising a setting device for setting the specific temperature to a desired temperature.

6. The air-conditioning apparatus of claim 4, further comprising a setting device for setting the specific temperature to a desired temperature.

7. The air-conditioning apparatus of claim 1, wherein the controller is further configured to, while performing defrosting, perform a first defrosting operation mode which is the heat recovery defrosting operation, when the temperature of the heat medium is determined to be equal to or higher than a first specific temperature at which the heat-source-side refrigerant can be effectively heated when the pumps are driven at the specific pump capacity, and then determine whether the temperature of the heat medium is equal to or higher than a second specific temperature such that freezing of the heat medium will not occur, continue the first defrosting operation mode, when the temperature of the heat medium is determined to be equal to or higher than the second specific temperature such that freezing of the heat medium will not occur, perform a second defrosting operation mode in which the heat quantity is not recovered from the heat medium in such a manner that the heat medium is prevented from freezing, when the temperature of the heat medium is determined to not be equal to or higher than the second specific temperature such that freezing of the heat medium can occur.

\* \* \* \* \*